US012579511B1

(12) United States Patent
Cornford et al.

(10) Patent No.: US 12,579,511 B1
(45) Date of Patent: Mar. 17, 2026

(54) MANAGING ALLOCATION OF STORAGES IN FULFILLMENT CENTER

(71) Applicant: Coupang Corp., Seoul (KR)

(72) Inventors: Matthew Cornford, Seoul (KR); Bragadesh Rajaraman, Taipei (TW); Xiufang Zhu, Bejing (CN); Venkataraja Nellore, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 19/189,543

(22) Filed: Apr. 25, 2025

(51) Int. Cl.
  *G06Q 10/087* (2023.01)
  *B65G 49/00* (2006.01)
(52) U.S. Cl.
  CPC ........... *G06Q 10/087* (2013.01); *B65G 49/00* (2013.01)
(58) Field of Classification Search
  CPC ................. G06Q 10/087; G06Q 10/08; G06Q 10/06311; G06Q 10/06315; G06Q 20/203; G06Q 30/0639; G06Q 10/0833; G06Q 10/0631; G06Q 30/0631; G06Q 10/083; G06Q 10/0832; G06Q 10/04; G06Q 30/02; G06Q 30/06; G06Q 10/0637
  See application file for complete search history.

(56) References Cited

U.S. PATENT DOCUMENTS

| | | | | |
|---|---|---|---|---|
| 11,436,560 B2 * | 9/2022 | Wintz | ................. | G06Q 10/0838 |
| 2015/0095091 A1 * | 4/2015 | Kamdar | ............... | G06Q 10/087 |
| | | | | 705/7.25 |
| 2018/0058739 A1 * | 3/2018 | Zou | .......................... | F25B 49/00 |
| 2018/0247257 A1 * | 8/2018 | Lert, Jr. | ............... | G06Q 10/087 |
| 2020/0034780 A1 * | 1/2020 | Sikka | .................. | G06Q 30/0202 |
| 2021/0245956 A1 * | 8/2021 | Douglas | ............... | B65G 1/1375 |
| 2023/0230031 A1 * | 7/2023 | Lert, Jr. | ............... | G06Q 10/087 |
| | | | | 705/28 |
| 2023/0325762 A1 * | 10/2023 | Parepalli | ............ | G06Q 30/0202 |
| | | | | 705/28 |
| 2024/0403827 A1 * | 12/2024 | Haley | ............... | G06Q 10/0875 |

* cited by examiner

*Primary Examiner* — Florian M Zeender
*Assistant Examiner* — Vanessa Deligi
(74) *Attorney, Agent, or Firm* — Fish & Richardson P.C.

(57) ABSTRACT

A method for managing storage allocation in a warehouse includes obtaining inventory data including SKUs, determining a sales velocity of each of the SKUs, generating a storage allocation plan that assigns each SKU to a particular storage system among a plurality of storage systems and a particular slot of the particular storage system based on at least one of the sales velocity of the SKU, the temperature zone of the storage system, or a capacity of a transportation device of the storage system, and transmitting the storage allocation plan to the transportation device to move products corresponding to the SKUs in accordance with the storage allocation plan.

22 Claims, 9 Drawing Sheets

400

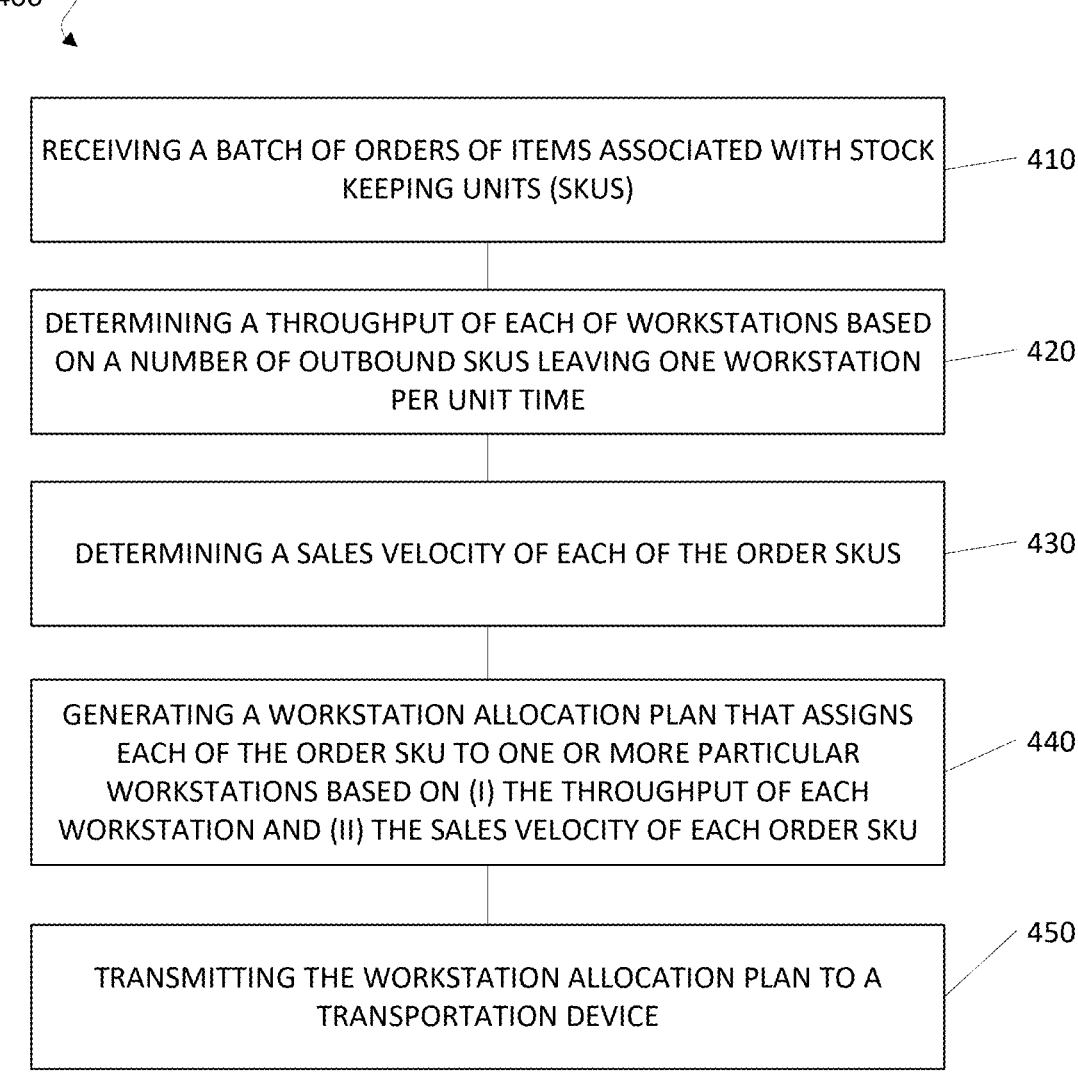

RECEIVING A BATCH OF ORDERS OF ITEMS ASSOCIATED WITH STOCK KEEPING UNITS (SKUS) — 410

DETERMINING A THROUGHPUT OF EACH OF WORKSTATIONS BASED ON A NUMBER OF OUTBOUND SKUS LEAVING ONE WORKSTATION PER UNIT TIME — 420

DETERMINING A SALES VELOCITY OF EACH OF THE ORDER SKUS — 430

GENERATING A WORKSTATION ALLOCATION PLAN THAT ASSIGNS EACH OF THE ORDER SKU TO ONE OR MORE PARTICULAR WORKSTATIONS BASED ON (I) THE THROUGHPUT OF EACH WORKSTATION AND (II) THE SALES VELOCITY OF EACH ORDER SKU — 440

TRANSMITTING THE WORKSTATION ALLOCATION PLAN TO A TRANSPORTATION DEVICE — 450

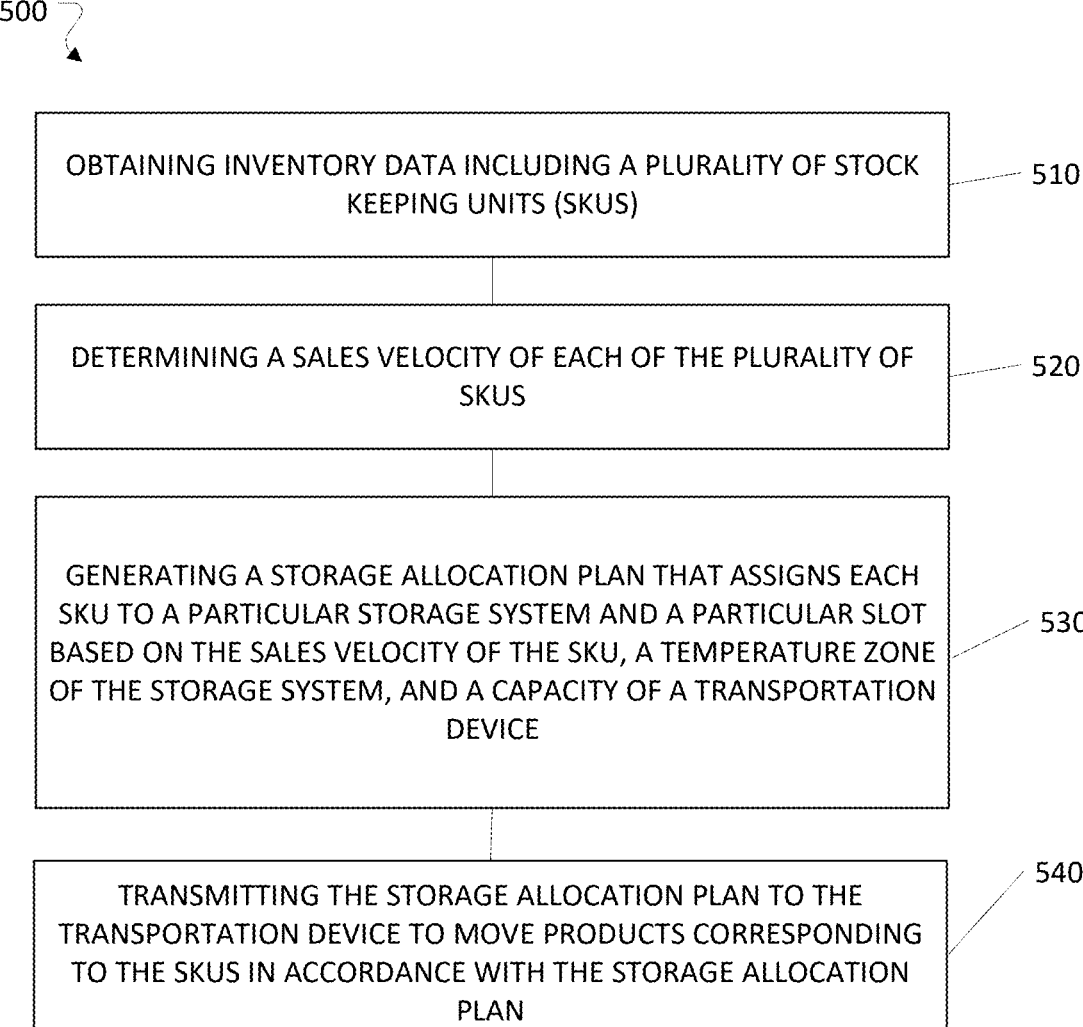

OBTAINING INVENTORY DATA INCLUDING A PLURALITY OF STOCK KEEPING UNITS (SKUS) —— 510

DETERMINING A SALES VELOCITY OF EACH OF THE PLURALITY OF SKUS —— 520

GENERATING A STORAGE ALLOCATION PLAN THAT ASSIGNS EACH SKU TO A PARTICULAR STORAGE SYSTEM AND A PARTICULAR SLOT BASED ON THE SALES VELOCITY OF THE SKU, A TEMPERATURE ZONE OF THE STORAGE SYSTEM, AND A CAPACITY OF A TRANSPORTATION DEVICE —— 530

TRANSMITTING THE STORAGE ALLOCATION PLAN TO THE TRANSPORTATION DEVICE TO MOVE PRODUCTS CORRESPONDING TO THE SKUS IN ACCORDANCE WITH THE STORAGE ALLOCATION PLAN —— 540

MONITORING THE INVENTORY DATA AND THE SALES VELOCITY OVER A PREDETERMINED PERIOD ———— 610

DETERMINING A CHANGE OF THE SALES VELOCITY BASED ON A REPLENISHMENT RATE OF EACH OF THE SKUS STORED IN A SLOT OF THE STORAGE SYSTEM OVER THE PREDETERMINED PERIOD ———— 620

UPDATING THE STORAGE ALLOCATION PLAN BASED ON THE CHANGE OF THE SALES VELOCITY EXCEEDING A THRESHOLD ———— 630

700

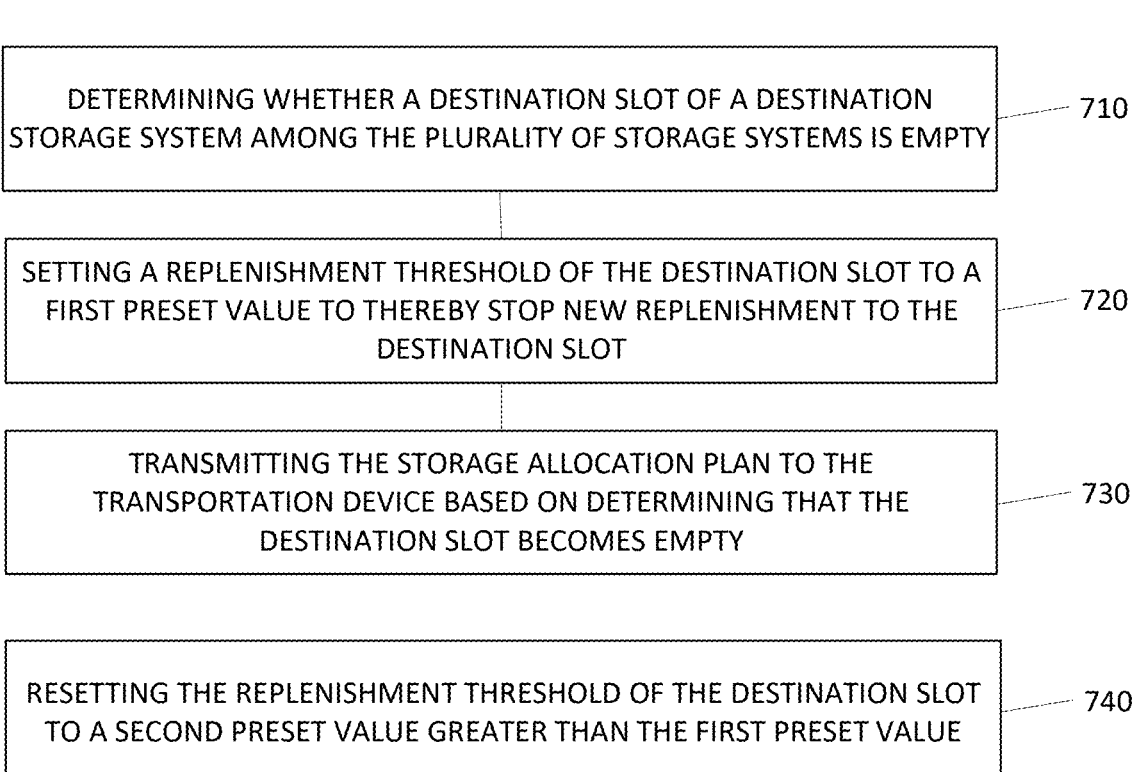

DETERMINING WHETHER A DESTINATION SLOT OF A DESTINATION STORAGE SYSTEM AMONG THE PLURALITY OF STORAGE SYSTEMS IS EMPTY — 710

SETTING A REPLENISHMENT THRESHOLD OF THE DESTINATION SLOT TO A FIRST PRESET VALUE TO THEREBY STOP NEW REPLENISHMENT TO THE DESTINATION SLOT — 720

TRANSMITTING THE STORAGE ALLOCATION PLAN TO THE TRANSPORTATION DEVICE BASED ON DETERMINING THAT THE DESTINATION SLOT BECOMES EMPTY — 730

RESETTING THE REPLENISHMENT THRESHOLD OF THE DESTINATION SLOT TO A SECOND PRESET VALUE GREATER THAN THE FIRST PRESET VALUE — 740

FIG. 7

MANAGING ALLOCATION OF STORAGES IN FULFILLMENT CENTER

TECHNICAL FIELD

The present disclosure relates to a system and method for managing allocation of storage systems in a warehouse, and more particularly, a computerized method for managing allocation of automated storage systems and storage slots of the storage systems.

BACKGROUND

The efficiency of fulfillment center (FC) operations is an important aspect in meeting the increasing demands of online customers and ensuring timely delivery of products. A key process in FCs is the optimum storage plan for the efficient transferring of items from inventory, as well as accurate order fulfillment and the timely packing and shipping of products to customers.

SUMMARY

The present disclosure describes a method for managing storage allocation of multiple storage systems and storage slots of the storage systems in a fulfillment center.

According to one aspect of the subject matter described in this application, a method for managing storage allocation in a warehouse includes obtaining inventory data including a plurality of stock keeping units (SKUs), where each SKU is associated with a product, a size of the product, and a recommended storage temperature of the product. The warehouse includes a plurality of storage systems disposed in the warehouse, where each storage system includes a plurality of slots configured to store one or more of the plurality of SKUs, and each storage system is associated with (i) a slot capacity of each slot, (ii) a temperature zone in the warehouse, and (iii) a transportation device configured to move the plurality of SKUs among the plurality of storage systems or within one storage system. The method further includes determining a sales velocity of each of the plurality of SKUs, generating a storage allocation plan that assigns each SKU to a particular storage system among the plurality of storage systems and a particular slot of the particular storage system based on at least one of the sales velocity of the SKU, the temperature zone of the storage system, or a capacity of the transportation device, and transmitting the storage allocation plan to the transportation device to move products corresponding to the plurality of SKUs in accordance with the storage allocation plan.

Implementations according to this aspect can include one or more of the following features. For example, generating the storage allocation plan further can include assigning the plurality of SKUs to the particular storage system based on matching the recommended storage temperature to the temperature zone in the warehouse. In some implementations, generating the storage allocation plan can include generating a predicted allocation model by machine learning based on inputs of (i) prior sales data of sample SKUs and (ii) prior allocation plans that were generated for sales periods of the prior sales data of the sample SKUs, and determining the storage allocation plan based on an output of the predicted allocation model from an input of the plurality of SKUs.

In some implementations, the method can further include monitoring the inventory data and the sales velocity over a predetermined period, determining a change of the sales velocity based on a replenishment rate of each of the SKUs stored in a slot of the storage systems over the predetermined period, updating the storage allocation plan based on the change of the sales velocity exceeding a threshold, and transmitting the updated storage allocation plan to the transportation device. In some examples, monitoring the sales velocity can include obtaining prior sales data of the plurality of SKUs for one or more weeks, one or more months, or one or more years.

In some implementations, the method can further include determining a throughput rating of each of the plurality of storage systems based on a transportation capacity of the respective transportation device, a transportation speed of the respective transportation device, and travel distances from the respective storage system to workstations that are provided downstream of at least one of the plurality of storage systems, and updating the storage allocation plan based on matching the sales velocity to the throughput rating.

In some implementations, the method can further include determining whether a destination slot of a destination storage system among the plurality of storage systems is empty, and based on determining that the destination slot is not empty, setting a replenishment threshold of the destination slot to a first preset value to thereby stop new replenishment to the destination slot, where transmitting the storage allocation plan can include transmitting the storage allocation plan to the transportation device based on determining that the destination slot becomes empty after the replenishment threshold has been set to the first preset value, and resetting the replenishment threshold of the destination slot to a second preset value greater than the first preset value.

In some implementations, the method can further include determining an empty-slot ratio of empty slots relative to a total number of the plurality of slots of each of the plurality of storage systems, where generating the storage allocation plan can include generating the storage allocation plan based on the empty slots while maintaining the empty-slot ratio to be greater than or equal to a predetermined ratio.

In some implementations, determining the sales velocity can include determining a volumetric sales velocity based on a demand frequency and the size of each of the plurality of SKUs. In some examples, the plurality of storage systems include (i) a shuttle system including racks and rails, (ii) a loader system including racks and cranes, and (iii) a pallet system including pallets that are made of wood, plastic, or metal, where the transportation device can include rails, cranes, a conveyor system, automated ground vehicles (AGVs), or forklifts.

According to another aspect, a computer-implemented system for managing storage allocation in a warehouse includes at least one processor and a non-transitory memory coupled to the at least one processor and storing instructions that, based on being executed by the at least one processor, perform operations. The operations include obtaining inventory data including a plurality of stock keeping units (SKUs), where each SKU is associated with a product, a size of the product, and a recommended storage temperature of the product. The warehouse includes a plurality of storage systems disposed in the warehouse, where each storage system includes a plurality of slots configured to store one or more of the plurality of SKUs, and each storage system is associated with (i) a slot capacity of each slot, (ii) a temperature zone in the warehouse, and (iii) a transportation device configured to move the plurality of SKUs among the plurality of storage systems or within one storage system. The operations further include determining a sales velocity of each of the plurality of SKUs, generating a storage allocation plan that assigns each SKU to a particular storage system among the plurality of storage systems and a particular slot of the particular storage system based on at least one of the sales velocity of the SKU, the temperature zone of the storage system, or a capacity of the transportation device, and transmitting the storage allocation plan to the transportation device to move products corresponding to the plurality of SKUs in accordance with the storage allocation plan.

Implementations according to this aspect can include one or more of the above-described features with respect to the method and the following features. For example, generating the storage allocation plan can further include assigning the plurality of SKUs to the particular storage system based on matching the recommended storage temperature to the temperature zone in the warehouse. In some examples, generating the storage allocation plan can include generating a predicted allocation model by machine learning based on inputs of (i) prior sales data of sample SKUs and (ii) prior allocation plans that were generated for sales periods of the prior sales data of the sample SKUs, and determining the storage allocation plan based on an output of the predicted allocation model from an input of the plurality of SKUs.

In some implementations, the operations can further include monitoring the inventory data and the sales velocity over a predetermined period, determining a change of the sales velocity based on a replenishment rate of each of the SKUs stored in a slot of the storage systems over the predetermined period, updating the storage allocation plan based on the change of the sales velocity exceeding a threshold, and transmitting the updated storage allocation plan to the transportation device. In some examples, monitoring the sales velocity can include obtaining prior sales data of the plurality of SKUs for one or more weeks, one or more months, or one or more years.

In some examples, the operations can further include determining a throughput rating of each of the plurality of storage systems based on a transportation capacity of the respective transportation device, a transportation speed of the respective transportation device, and travel distances from the respective storage system to workstations that are provided downstream of at least one of the plurality of storage systems, and updating the storage allocation plan based on matching the sales velocity to the throughput rating.

In some implementations, the operations can further include determining whether a destination slot of a destination storage system among the plurality of storage systems is empty, and based on determining that the destination slot is not empty, setting a replenishment threshold of the destination slot to a first preset value to thereby stop new replenishment to the destination slot, where transmitting the storage allocation plan can include transmitting the storage allocation plan to the transportation device based on determining that the destination slot becomes empty after the replenishment threshold has been set to the first preset value, and resetting the replenishment threshold of the destination slot to a second preset value greater than the first preset value.

In some examples, the operations can further include determining an empty-slot ratio of empty slots relative to a total number of the plurality of slots of each of the plurality of storage systems, where generating the storage allocation plan can include generating the storage allocation plan based on the empty slots while maintaining the empty-slot ratio to be greater than or equal to a predetermined ratio. In some examples, determining the sales velocity can include determining a volumetric sales velocity based on a demand frequency and the size of each of the plurality of SKUs.

In some implementations, the plurality of storage systems can include (i) a shuttle system including racks and rails, (ii) a loader system including racks and cranes, and (iii) a pallet system including pallets that are made of wood, plastic, or metal, and the transportation device can include rails, cranes, a conveyor system, automated ground vehicles (AGVs), or forklifts.

BRIEF DESCRIPTION OF THE DRAWINGS

FIG. 4 is a flowchart showing an example process for workstation allocation at a fulfillment center.

FIG. 5 is a flowchart showing an example process for storage allocation at a fulfillment center.

FIG. 7 is a flowchart showing an example process for slotting and re-slotting storages at a fulfillment center.

DETAILED DESCRIPTION

A warehouse can include a fulfillment center (FC) that is a facility configured to handle the receiving, storing, picking, and shipping of ordered products to customers. The order fulfillment process can involve a continuous movement of the product units within the FC, where the overall throughput of the FC can be improved by reducing the distance traveled per unit stored or picked to thereby achieve a higher hourly throughput (HT P) rate. For instance, the product units can move between a receiving location and storage systems, within the storage systems, between the storage systems and a packing system, and between a packing system and a shipping location. Consequently, optimizing allocation of storage systems and flow-racks in the FC can address inefficiencies in the order fulfillment process in real time and enhance the productivity of the fulfillment center. This approach also provides an efficient allocation of limited resources (e.g., computing resources as well as logistic resources) of the fulfillment center.

Figure 1:
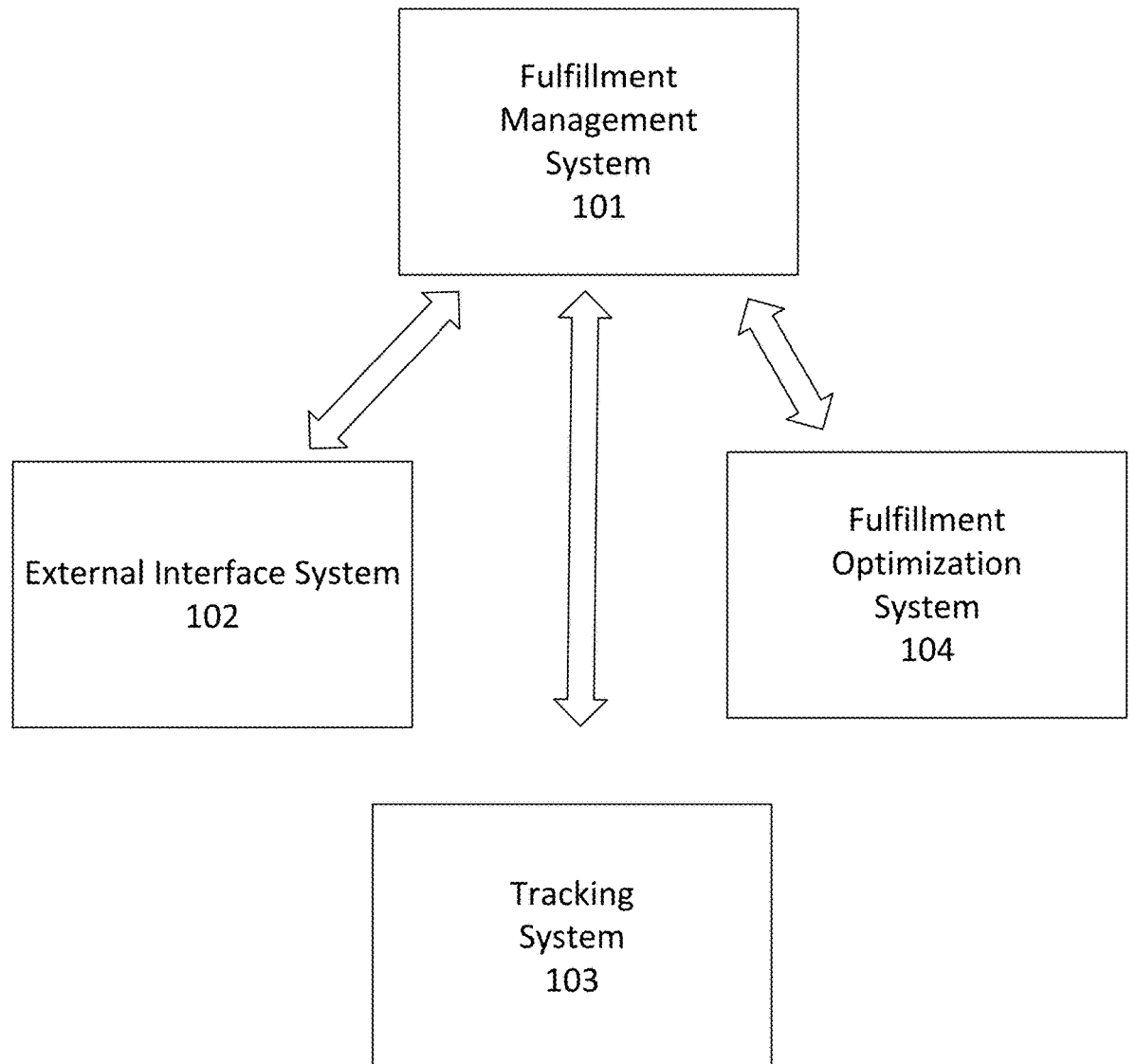
FIG. 1 is a diagram illustrating an example of a network including computerized systems for communications enabling shipping, transportation, and logistics operations.

FIG. 1 is a diagram illustrating an example of a network including computerized systems for communications enabling shipping, transportation, and logistics operations. A system 100 can include computerized systems for communications enabling shipping, transportation, and logistics operations. For example, the system 100 can include a variety of systems, each of which can be connected to one another via one or more networks. The systems can also be connected to one another via a direct connection, for example, using a cable.

The depicted systems include a fulfillment management (FM) system 101, an external interface system 102, a tracking system 103, and a fulfillment optimization (FO) system 104.

The FM system 101 can be implemented as a computer system that monitors order status and delivery status. For example, the FM system 101 can determine whether an order is past its Promised Delivery Date (PDD) and can take appropriate action, including initiating a new order, reshipping the items in the non-delivered order, canceling the non-delivered order, initiating contact with the ordering customer, or the like. The FM system 101 can also monitor other data, including output (such as a number of packages shipped during a particular time period) and input (such as the number of empty cardboard boxes received for use in shipping). The FM system 101 can also act as a gateway between different devices in system 100, enabling communication (e.g., using store-and-forward or other techniques) between devices such as external interface system 102 and FO system 104.

The external interface system 102 can be implemented as a computer system that enables external users to interact with one or more systems in the system 100. For example, in implementations where the system 100 enables the presentation of systems to enable users to place an order for an item, the external interface system 102 can be implemented as a web server that receives search requests, presents item pages, and solicits payment information. For example, the external interface system 102 can be implemented as a computer or computers running software for receiving and processing requests from external devices, acquire information from databases and other data stores based on those requests, and provide responses to the received requests based on acquired information.

The tracking system 103 can be implemented as a computer system that receives, stores, and forwards information regarding the location of packages containing products ordered by customers. In some implementations, the tracking system 103 can request or store information from web servers operated by shipping companies that deliver packages containing products ordered by customers.

The fulfillment optimization (FO) system 104 can be implemented as a computer system that stores information for customer orders from other systems (e.g., the external interface system 102 and/or the tracking system 103). The FO system 104 can also store information describing where particular items are held or stored. For example, certain items may be stored only in one fulfillment center, while certain other items may be stored in multiple fulfillment centers. In some implementations, certain fulfilment centers may be designed to store only a particular set of items (e.g., fresh produce or frozen products). The FO system 104 can store this information as well as associated information (e.g., quantity, size, date of receipt, expiration date, etc.).

The FO system 104 can also calculate a corresponding PDD (promised delivery date) for each product. The PDD, in some implementations, can be based on one or more factors. For example, the FO system 104 can calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some implementations, the FO system 104 can determine a PDD for each product on a periodic basis (e.g., hourly) and store it in a database for retrieval or sending to other systems (e.g., the external interface system 102, the FM system 101, the tracking system 103). In some implementations, the FO system 104 can receive electronic requests from one or more systems (e.g., the external interface system 102, the FM system 101, the tracking system 103) and calculate the PDD on demand.

Figure 2:
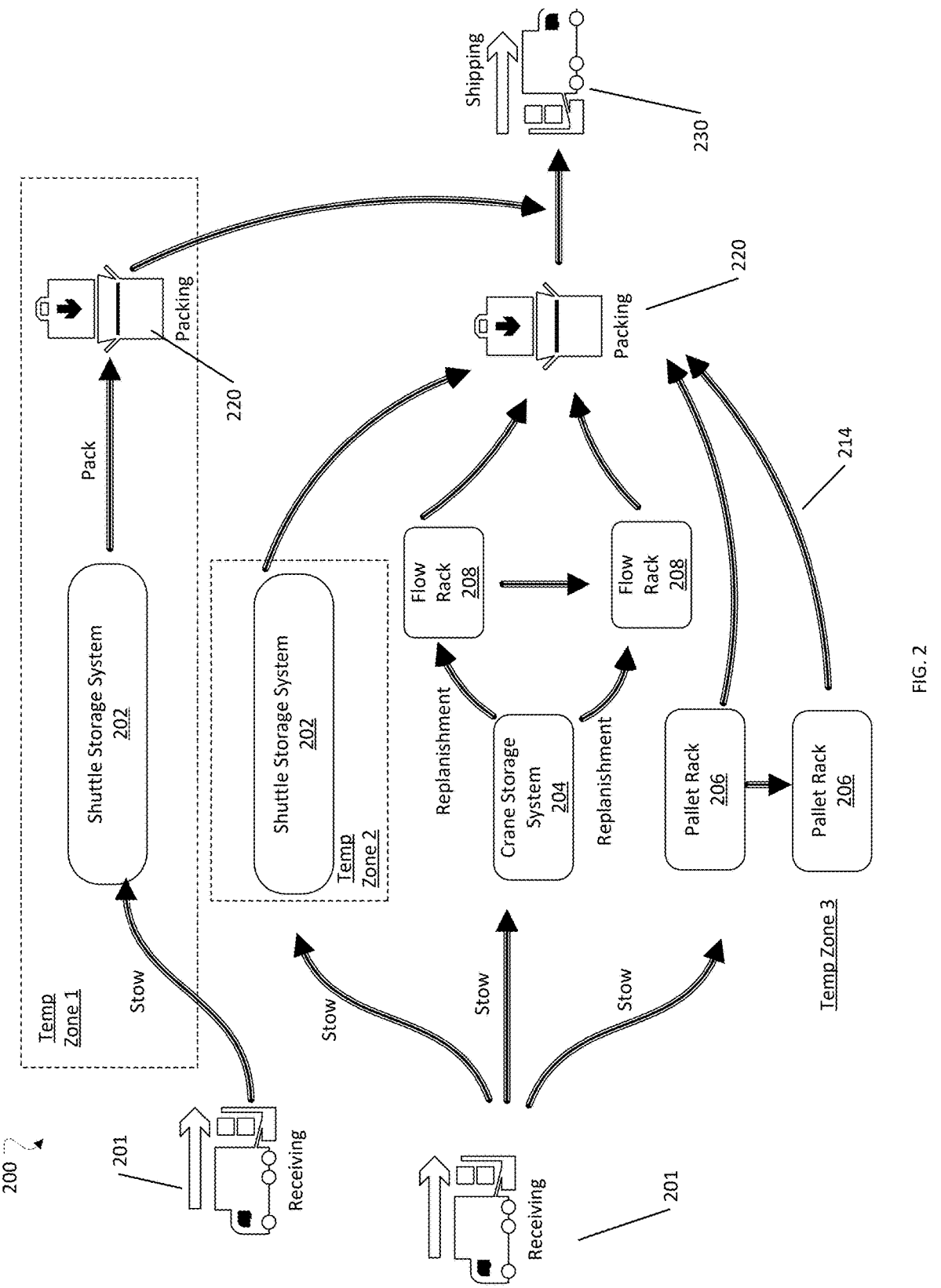
FIG. 2 is a diagram illustrating an example of a fulfillment center configured to utilize computerized systems to execute a storage allocation plan and a workstation allocation plan.

FIG. 2 is a diagram illustrating an example of a fulfillment center 200. The fulfillment center 200 is an example of a physical location/facility that stores items for shipping to customers when ordered. The fulfillment center (FC) 200 can be divided into multiple zones. In some examples, the FC 200 can be arranged in multiple floors of one or more buildings. These "zones," in some implementations, can be thought of as virtual divisions between different stages of a process of receiving items, storing the items, retrieving the items, and shipping the items.

In some implementations, the zones in the FC 200 can include a plurality of temperature zones that are configured to maintain a particular temperature range corresponding to the products handled in those zones. For instance, the FC 200 can include Temp Zone 1 for handing frozen products below 0 degrees Celsius, Temp Zone 2 for handling chilled products between 0 degrees Celsius and an ambient temperature, and Temp Zone 3 for handling general products at the ambient temperature.

In some implementations, the FC 200 can have a receiving zone 201 where product items are delivered into the FC 200. In some examples, as shown in FIG. 2, the FC 200 can have multiple receiving zones configured to deliver items according to the temperature zones of the FC 200.

The FC 200 can include a plurality of storage systems 202, 204, and 206 that are configured to store the items received from the receiving zone 201. For example, the storage systems 202, 204, and 206 can include one or more of physical shelving, bookshelves, boxes, totes, refrigerators, freezers, cold stores, or the like. In some implementations, the storage systems can be a place for an operator to pick the stored items to fulfill customer orders. In some examples, the storage systems 202, 204, and 206, as well as flow racks 208 can referred to as picking zones from which an operator can pick the stored items to fulfill customer orders. In some examples, the picking zones can be organized into multiple floors.

In some implementations, workers or machines can move items into or between picking zones in multiple ways, including, for example, a forklift, an elevator, a conveyor belt, a cart, a handtruck, a dolly, an automated robot or device, or manually. For example, FIG. 2 illustrates various transport mechanisms 214 in arrow lines and curves between the receiving zone 201 and each of the storage systems 202, 204, and 206. In some examples, the transport mechanism 214 can include a conveyor system configured to move items in the FC 200. Further, the transport mechanisms 214 can be provided to move items from the storage systems 202, 204, and 206 to a packing zone 220, and a shipping zone 230.

In some implementations, the storage systems include a shuttle storage system 202, a crane loader system 204, and pallet racks 206. The FC 200 can include a multiple of these storage systems or other types of storage systems, although FIG. 2 shows some of those systems, for example. In some cases, each storage system can be configured to operate in a particular temperature zone. For instance, the FC 200 can include shuttle storage systems disposed in the Temp Zone 1 and T emp Zone 2, respectively, multiple pallet racks 206 provided in the Temp Zone 3, and one or more crane loader systems 204 provided in the Temp Zone 3, as well. In some examples, one or more crane loader systems 204 can be provided in the Temp Zone 2 for storing chilled products.

In some implementations, the storage systems 202, 204, and 206 can have different accessibility ratings based on the positions and structure of the storage systems 202, 204, and 206. For example, a storage system located closer to another region in the fulfillment center (e.g., flow racks 208, packing zone 220, or receiving 201) can have a higher accessibility rating than a storage system located farther from the other region of the fulfillment center because of the travel distance of the transport mechanism 214 to/from the other region in the fulfillment center. In some examples, a storage system (e.g., pallet racks 206) can have an open structure that can be accessed from multiple directions, while other storage systems (e.g., shuttle storage systems 202 and the crane loader system 204) have a structure that can be accessed in preset directions as storage spaces are organized in rows and columns in a frame or shelf structure.

In some implementations, the FC 200 can include flow racks 208 that are disposed downstream of the storage systems (e.g., the crane loader system 204) and configured to receive the items through the conveyor system. For instance, the crane loader system 204 are connected to a plurality of flow racks 208 and configured to provide replenishment to each flow rack 208 as the items are being transferred to the packing zone 220.

In some implementations, an operator can receive an instruction to place (e.g. "Stow") the items from the receiving zone 210 into particular spots of one or more of the storage systems, such as a particular space ("slot") on the storage system. For example, a picker can scan the item using a mobile device (collection device). The device can indicate where the picker should stow the item, for example, using a system that indicate an aisle, shelf, and location. The device can then prompt the picker to scan a barcode at that location before stowing the item in that location. The device can send (e.g., via a wireless network) data to a computer system indicating that the item has been stowed at the location by the user using the device.

Once a user places an order, a picker can receive an instruction on the device to retrieve one or more items from the storage system. The picker can retrieve the item, scan a barcode on the item, and place it on a transport mechanism 214. While the transport mechanism 214 is represented as a slide, in some implementations, the transport mechanism can be implemented as one or more of rails, a conveyor belt, an elevator, a crane, a forklift, a handtruck, a dolly, or the like. The item may then arrive at the packing zone 220.

The packing zone 220 can be an area of the FC 200 where items are received from the picking zone 210 and packed into boxes or bags for eventual shipping at a shipping zone 230 to customers. In some implementations, frozen items stored in the shuttle storage system 202 in the Temp Zone 1 can be packed in the Temp Zone 1 and moved to the shipping zone 230 via the transport mechanism 214 such as a conveyor system.

Figure 3A:
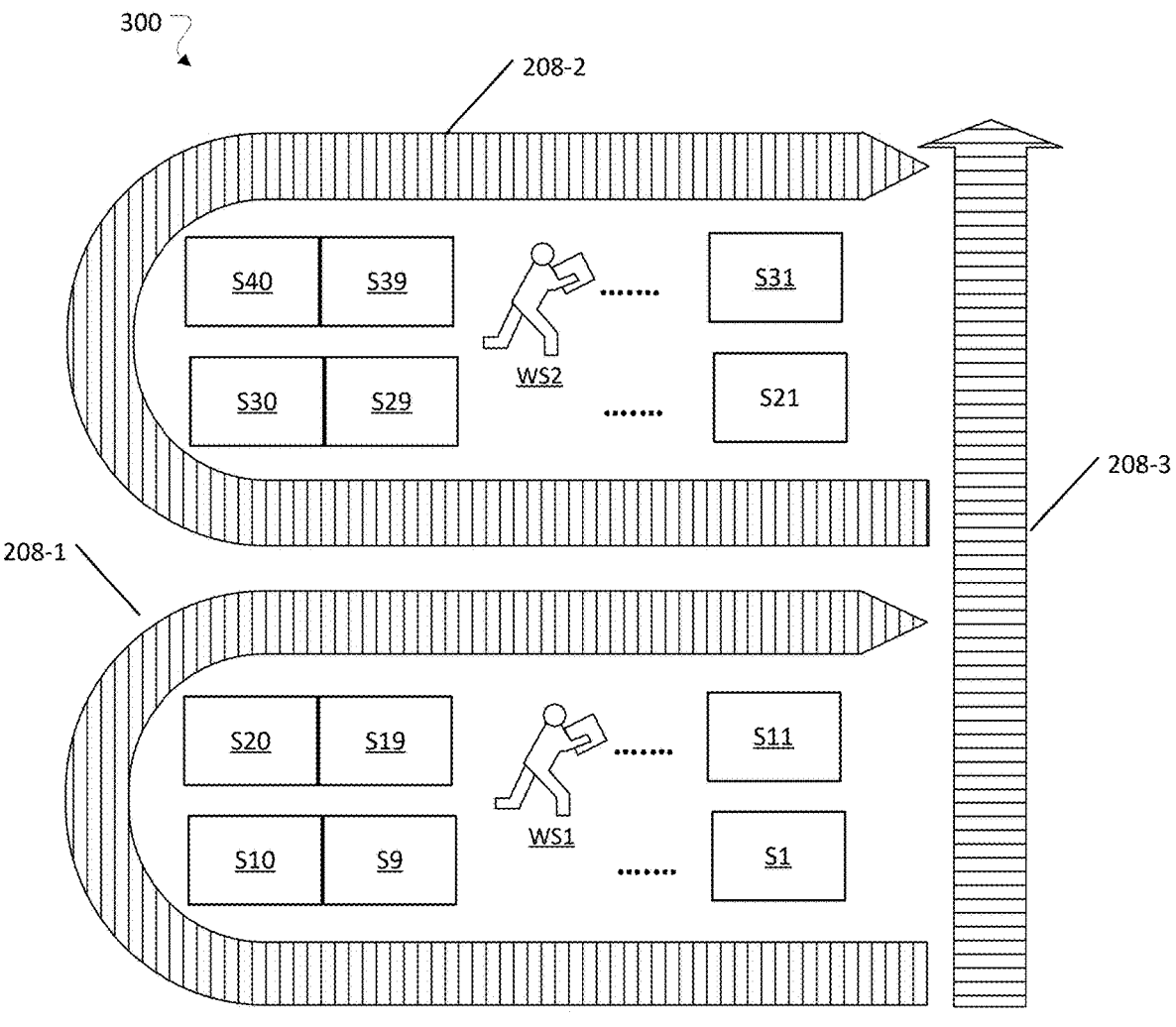
FIG. 3A is a diagram illustrating an example of a flow-rack system configured to utilize computerized systems to execute a workstation allocation plan.

FIG. 3A illustrates an example of a flow-rack system 300 configured to utilize computerized systems to execute a workstation allocation plan.

In some implementations, the flow-rack system 300 can include one or more flow racks 208 (see FIG. 2) provided in a flow rack ("FR") zone that is downstream of the storage systems. The flow-rack system 300, for instance, includes two flow racks 208-1 and 208-2, but the FC 200 can include various numbers of flow racks. In some examples, the FR zone can be divided by a plurality of workstations WS1 and WS2, where one or more operators pick up the items from inbound containers and put them in outbound containers. In some examples, workstations WS1 and WS2 can be provided to process items carried by the flow racks 208-1 and 208-2, respectively. For instance, a single workstation can be assigned to handle the process on a single flow rack.

In some cases, there can be physical barriers between picking workstations, and one picker may only pick at one workstation during peak times. In some cases, due to limited resources, at most one picker can pick/transfer items at one workstation. As such, a slot allocation model can be provided to decide which items should be allocated to which workstation and slots to thereby balance the workload across workstations and increase the picking efficiency. The allocation model will be described in detail later in the application.

In some implementations, the flow racks 208-1 can be implemented as a first conveyor belt moving through a plurality of slots S1 to S20, and the flow racks 208-2 can be implemented as a second conveyor belt moving through a plurality of slots S21 to S40. The slots S1 to S40 are spaces where the items are delivered from the storage systems, where the operator at the workstation transfers the items between inbound and outbound containers (e.g., totes). The number of slots in one flow rack can depend on the temperature zones in the FC 200. For instance, the flow racks in the Temp Zone 1 or 2 (frozen or chilled zone) can have 16 slots per workstation, while the flow racks in the Temp Zone 3 (ambient zone) can have 20 slots per workstation.

The flow-rack system 300 can further include a flow rack 208-3 configured to transport the items from the plurality of flow racks 208-1 and 208-2. For example, the flow rack 208-3 can include a third conveyor belt arranged between the flow racks 208-1 and 208-2. In some examples, the flow racks 208-1 and 208-2 can be separate from each other and configured to independently operate to deliver the items to the flow rack 208-3. The flow rack 208-3 can move through multiple flow racks to enable operators to complete the picking of the items that have not been picked from a previous workstation(s) of the other flow racks. And the flow rack 208-3 can transfer the picked items to subsequent zones in the FC 200, for example, the packing zone 220. In some cases, the FC 200 can further include a "rebin" zone where the picked items are re-grouped in accordance with the customer order before packing the items in the packing zone 220.

Figure 3B:
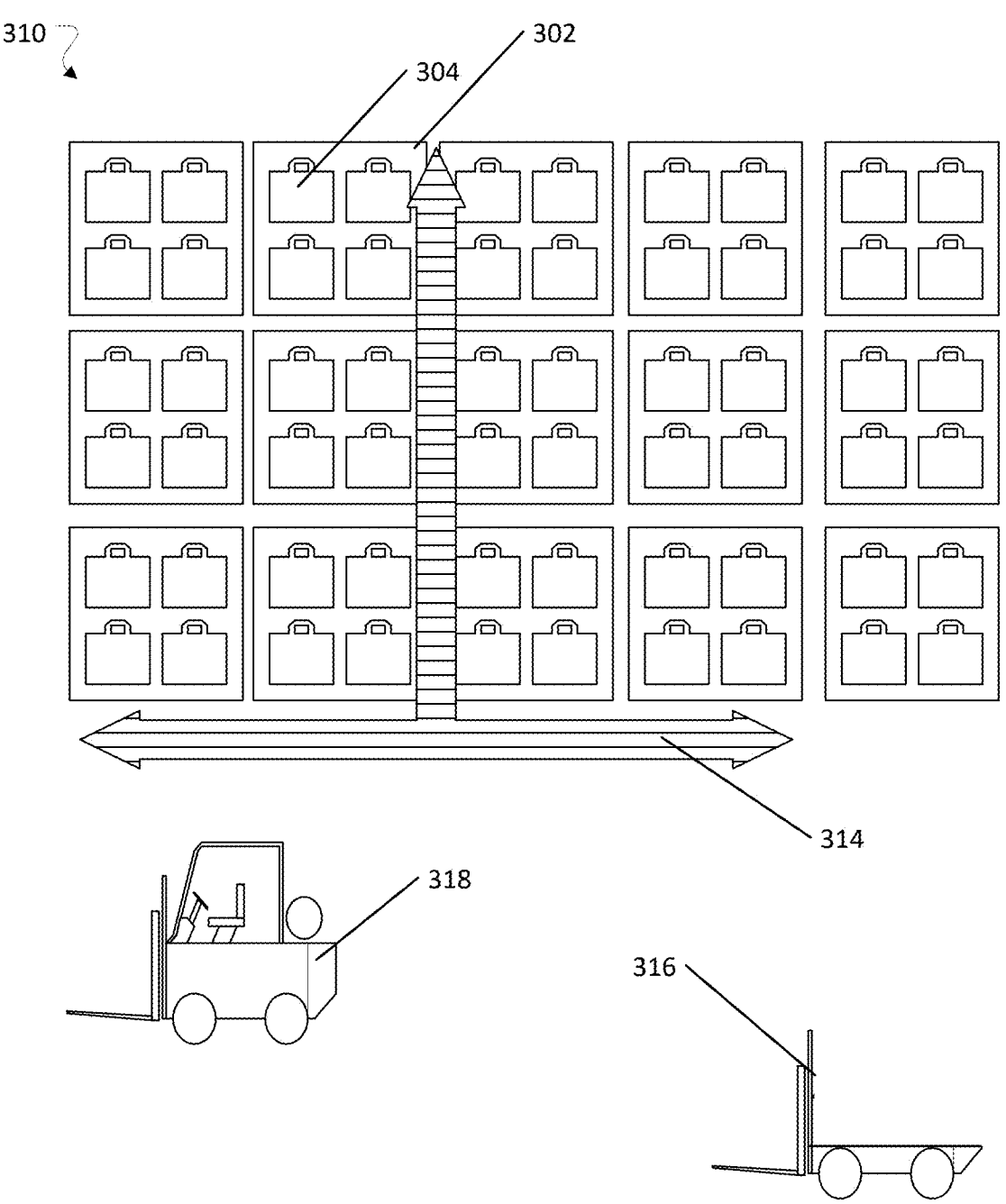
FIG. 3B is a diagram illustrating an example of a storage system and transportations devices configured to utilize computerized systems to execute a storage allocation plan.

FIG. 3B is a diagram illustrating an example of a storage system 310 and transportations devices configured to utilize computerized systems to execute a storage allocation plan.

For example, the storage system 310 can include a plurality of slots 302 configured to store one or more items 304 therein. The storage system 310 can further include one or more transportation devices 314.

In some implementations, the storage system 310 can include the shuttle storage system 202, the crane loader system 204, or the pallet racks 206, which were described above with respect to FIG. 2, or other types of storage systems such as shelves. In some examples, the storage system 310 can include columns and rows of slots 302 that are configured to store the one or more items 304 therein. Each slot 302 can be assigned to store a particular item associated with a stock-keeping unit ("SKU"), where each slot 302 has a preset storage volume. In some cases, each slot 302 can store one or more of the same SKU items based on the storage volume of one slot 302 being larger than the size of a single item of the SKU. In some cases, a larger item, which have a volume larger than the storage volume of one slot 302, can be stored across multiple slots 302 or stored in another storage system having a larger storage volume per slot.

In some implementations, the slots 302 in the storage system 310 can have different accessibility ratings based on the positions of the slots 302. For example, a slot 302 located closer to a side end of the storage system 310 can have a higher accessibility rating than a slot 302 located in the middle region of the storage system 310 because of (i) the travel distance of the transportation device 314 within the storage system 310 and (ii) the travel distance of the transportation device 314 between the storage system 310 and another region in the fulfillment center (e.g., another storage system, flow racks 208, packing zone 220, or receiving 201).

For example, the transportation device 314 can include a crane configured to move in a lateral direction along the floor of the fulfilment center and in a vertical direction orthogonal to the lateral direction. The crane loader system 204 can include one or more such cranes. In some examples, the transportation device 314 can include a rail system that includes horizontal rails that are arranged in orthogonal horizontal directions to thereby cross one another in each level of the storage system (e.g., the shuttle storage system 202). In addition, the transportation device 314 can further include a vertical elevator that is arranged at a side of the storage system and configured to move items between different levels of the storage system. In some cases, the cranes and rails can be referred to as intra-storage transportation device configured to move items within a storage system.

In some implementations, the transportation device 314 can also include one or more automated guided vehicles (AGVs) 316. For example, the AGV 316 can be a computer-controlled vehicle configured to transport items within the fulfilment center without a human driver. In some examples, the AGV 316 can be controlled to follow predefined travel routes or use a navigation system including one or more sensors. In some cases, the AGV 316 can refer to a robot or be driven by a robot. In some implementations, the transportation device 314 can also include a forklift 318 configured to be driven by a human operator to transport items in the fulfilment center.

The fulfilment center can use particular types of transportation devices 314 based on the storage systems and zones in the fulfilment center. For example, the AGVs 316 and forklift 318 can be mainly used for pallet racks 206, but can be also generally used any zone in the fulfillment center. The cranes can be used for the crane loader system 204, and the rail system can be used in the shuttle storage system 202.

FIG. 4 is a flowchart showing an example process 400 for workstation allocation at a fulfillment center. At least a portion of the process 400 can be performed by various elements of the FM system 101 or FO system 104.

In some implementations, operations of process 400 can include receiving a batch of orders of items associated with a plurality of stock keeping units (SKUs), respectively. where each SKU is associated with a product (410). For instance, an SKU can be multi-digit numbers assigned to a particular product to enable the fulfillment center to manage various items for sale in the fulfillment center. In some implementations, the batch of orders (i.e., corresponding order SKUs), can be received through a computer or mobile terminal that is connected to the FO system 104. In some cases, the order SKUs can be received through the FM system 101 and transferred to the FO system 104, and then retrieved by the computer terminal or the mobile terminal.

In some implementations, as shown in FIG. 3A, the fulfilment center can include a plurality of workstations that allow a plurality of operators to transfer the items corresponding to the order SKUs of the batch of orders from one or more inbound containers to one or more outbound containers. Each workstation can include a plurality of slots configured to accommodate the one or more inbound containers and the one or more outbound containers. The fulfillment center can also include a plurality of conveyors configured to move the one or more inbound containers and the one or more outbound containers along the plurality of workstations, where each conveyor is configured to move along one of the plurality of workstations.

Operations of process 400 can include determining a throughput of each of the plurality of workstations based on a number of outbound SKUs leaving one workstation per unit time (420). In some implementations, the throughput of each of the plurality of workstations can be set or input as a preset constraint (threshold, limit, or capacity) for a slot allocation algorithm. For example, in a case where an average number of an outbound volume of one SKU is 3500 per day from the fulfilment center, and a limit throughput of a workstation is 1000 per day, then the slot allocation algorithm is configured to assign 4 slots to accommodate this particular SKU to keep the workload on the workstation to be less than or equal to the limit throughput of the workstation. In some cases, the limit throughput of the workstation can be adjusted by a parameter setting. For example, the parameter can be set to (0.98, 1.02) to adjust the limit throughput between 98 and 102% of the limit throughput of the workstation. In such cases, the slot allocation algorithm can assign more or less than 4 slots to accommodate the particular SKU.

Operations of process 400 can include determining a sales velocity of each of the order SKUs (430). For example, the sales velocity can be determined by selecting sample SKUs of the fulfillment center, determining sample sales velocities of the sample SKUs based on a number of orders of each of the sample SKUs for a predetermined period, and determining the sales velocities of the order SKUs corresponding to the sample sales velocities, respectively. In some examples, the sample sales velocities can be also determined by a speed of replenishment to a storage slot assigned to a particular SKU.

In some implementations, the sales velocity can be also determined by obtaining prior sales data of the sample SKUs for a seasonal period, determining whether an order time of the batch of orders corresponds to the seasonal period, based on determining the order time corresponds to the seasonal period, determining the sales velocities of the order SKUs based on the prior sales data. For instance, the seasonal period can include holidays, school starts/ends, and vacation periods. In some cases, the prior sales data can relate to particular events that can cause supply shortages or demand spikes, such as harvest variations, pandemic outbreaks, labor strikes, etc.

In some examples, operations of the process 430 can include determining a volumetric sales velocity based on an order frequency and a volume of the product of each of the order SKUs. For example, the volumetric sales velocity can be obtained by multiplying a size (e.g., width, length, height, or volume) of the product and a number of the products ordered during a predetermined period. In this way, the limited slot space can be efficiently allocated. Specifically, in a case where a first product has a first volume, and a second product has a second volume greater than the first volume, the second product can be replenished faster than the first product although a second sales velocity of the second product is less than a first sales velocity of the first product.

Operations of the process 400 can include generating a workstation allocation plan (440). For example, the workstation allocation plan can be a computer file or instructions. In some examples, the workstation allocation plan is generated to assign each of the order SKU to one or more particular workstations among the plurality of workstations based on (i) the throughput of each of the plurality of workstations and (ii) the sales velocity of each of the order SKUs to thereby decrease a discrepancy between the throughputs of the plurality of workstations with respect to a baseline discrepancy between the throughputs. For example, the baseline discrepancy can be a prior value or a reference value of the discrepancy between the throughputs before applying the workstation allocation plan. In some cases, the workstation allocation plan can be repeatedly applied to optimize (i.e., keep reducing) the discrepancy between the throughputs with respect to a previously result of the optimization.

Balancing the throughputs (i.e., workload) of the workstations can increase a picking efficiency of the fulfillment process, as an over-loaded workstation can delay completion of customer orders while an under-loaded workstation could have been used to fulfill part of the same orders. In some examples, operations of the process 400 can set different target throughputs (HTP) for different picking zones based on the physical layout of the workstations, and generate the workstation allocation plan to achieve result throughputs between 90-110% of the target HTP.

In some implementations, the workstation allocation plan can be generated by using a predicted allocation model by machine learning based on inputs of (i) prior sales data of sample SKUs and (ii) prior workstation allocation plans that were generated for sales periods of the prior sales data of the sample SKUs, where the workstation allocation plan can be determined based on an output of the predicted allocation model from an input of the order SKUs. In some examples, an artificial intelligence (AI) model can be trained in real time with (i) sales data of sample SKUs and (ii) workstation allocation plans generated for sales periods of the sales data of the sample SKUs. The AI model can correlate the sales data and the workstation plans and output a workstation allocation plan from input of an SKU list. The AI model can perform an algorithm to generate the workstation allocation plan by minimizing a loss function corresponding to the discrepancy between the throughputs of the plurality of workstations. In some cases, the AI model can be previously trained based on prior sales data in another warehouse facility and then provided to the fulfillment center.

In some implementations, the workstation allocation plan can be generated by using a flow-rack slot allocation model based on a plurality of constraints or variables. For example, the constraints can include one or more of (i) a number of slots for accommodating a product corresponding to an SKU, (ii) a number of slots of one workstation, (iii) a weight limit of a product that the workstation is capable to handle, (iv) a recommended storage temperature of the ordered item, (v) a threshold capacity of the transportation device, and (vi) whether the item is live-stock item.

For example, operations of the process 400 can include setting a threshold capacity of the transportation device, where the threshold capacity includes a speed and an operation cycle of the transportation device and a weight and a size of SKUs that the transportation device is capable to transport. In some implementations, the threshold capacity can be input/set as a constraint for the flow-rack slot allocation model. In some examples, the threshold capacity can refer to a replenishment demand of a crane of a crane loader system. For instance, the replenishment demand can be set to 2000 containers (e.g., totes) per day, which represents 90 cycles per hour for 22 hours and 15 minutes, leaving some buffer each day for the crane to service inventory tasks and/or to be offline. Operations of the process 400 can distribute pick-demands of the workstations based on setting the threshold capacity of the crane, which delivers items to the workstations in accordance with the pick-demands.

In some implementations, operations of the process 400 can include determining a travel distance of the transportation device to each of the plurality of workstations, where the workstation allocation plan can be generated to decrease the travel distance of the transportation device. As described above, the crane or the conveyor system can be spaced apart from the flow racks and workstations and configured to move the items to the workstations to be picked in accordance with the customer orders. Minimizing the travel distance of the transportation device can help maximizing the HTP of the workstations.

In some examples, each SKU is further associated with a recommended storage temperature of the product. For instance, frozen items should be stored in a temperature less than 0 degrees Celsius, and diary items such as milk, cheese, yogurt, butter, etc. should be stored in a chilled temperature less than an ambient temperature. As such, in some implementations, the workstation allocation plan is generated to assign the order SKUs to a workstation that is designated to a particular temperature range corresponding to the recommended storage temperature of the product. For instance, the workstation allocation plan can include assignment data that associate SKUs with proper temperature zones.

In some implementations, operations of the process 440 can include determining whether the order SKUs include livestock items, and based on determining that the order SKUs includes the livestock items, assigning the order SKUs to a workstation that is designated to the livestock items. For example, an SKU can include a digit indicating whether the item is a livestock item, and layout information of the fulfilment center can define workstations designated to livestock items. The workstation allocation plan can include data that associate the SKU and the layout information to implement the live-stock constraint.

In some implementations, operations of the process 440 can include setting various parameters and functions to optimize the balance of the workload of the workstations. For instance, the parameters can include INV_s (the number of slots required for SKUs), CAP_w (the number of slots for a workstation w), P_s (the average outbound unit for SKUs), lamda (the lower bound of outbound unit per workstation), delta (the upper bound of outbound unit per workstation), and pi (the weight of an object). The parameters can include FREQ (s1, s2), which is the number of orders (or frequence) out of 1000 orders, for example, that require both SKU (s1, s2), where top association relationships (s1, s2) are considered. For example, 8 top pairs of order SKUs may be used for optimization of the allocation plan.

Operations of the process 440 can also include obtaining decision variables based on the parameters described above. For instance, the decision variables can include Q (s, w), which is an integer representing the number of slots to which an SKUs is allocated in workstation w, X (s, w), which is binary (e.g., 1: if Q (s, w)>0; 0: otherwise) set to avoid assigning multiple slots for one SKU in one workstation and reduce a number of decision variables, and Z_(s1, s2, w), which is binary (e.g., 1: if SKU (s1, s2) are both allocated in workstation w; 0: otherwise).

Operations of the process 440 can produce optimization objectives (e.g., functions) that indicate levels of (i) the workload balance of workstations in terms of picks, (ii) a number of orders completed in one workstation without splitting the orders or shipments across multiple workstations, (iii) minimizing the slotting change between slots, and (iv) replenishment workload balance of the transportation device. In some examples, the process 440 can optimize the allocation plan to achieve one or more of these optimization objectives.

Operations of the process 400 can include transmitting the workstation allocation plan to a transportation device (450), where the transportation device is configured to deliver the order SKUs from a storage system to the one or more particular workstations in accordance with the workstation allocation plan. For example, in a case where the transportation device is an automated system such as shuttle storage systems, crane loader systems, AGVs, etc., operations of the process 450 can include transmitting an instruction to a receiver or controller of the transportation device to execute the workstation allocation plan. Specifically, the crane can be configured to, based on receiving the instruction, deliver the order SKUs from the crane loader system to the one or more particular workstations and slots of the flow racks that are assigned by the workstation allocation plan. The transmitter and the receiver include electric circuits configured to communicate signals between the automated system and the transportation device, and among various systems, e.g., the FM system 101, the external interface system 102, the tracking system 103, and the FO system 104 (see FIG. 1).

In some cases, operations of the process 450 can also include transmitting, via a wire or wirelessly, an instruction to a computer or a mobile terminal of an operator of the transportation device such that the operator can perform the workstation allocation plan using the transportation device. For example, the operator of the forklift 318 or some other manual transportation device can deliver items to the one or more particular workstations that are assigned by the workstation allocation plan. In some cases, the operator can hand-carry the items according to the workstation allocation plan transferred to the operator's mobile terminal.

In some implementations, operations of the process 420 can be performed again or repeated to evaluate the workstation allocation plan. For example, a result throughput of each of the plurality of workstations can be determined by the FO system 104 once the workstation allocation plan has been executed in the process 450. In some examples, the process 400 can include determining a balance score of the result throughputs of the workstations, for example, by comparing ranges, variances, or standard deviations, etc. of the result throughputs.

FIG. 5 is a flowchart showing an example process 500 for storage allocation at a fulfillment center. At least a portion of the process 500 can be performed by various elements of the FM system 101 or FO system 104.

In some implementations, operations of the process 500 can include obtaining inventory data including a plurality of SKUs (510). As briefly described above, each SKU is a series of numbers associated with a particular product, a size of the product, and a recommended storage temperature of the product. For instance, the inventory data can include a table or list of SKUs and related information such as a number of items corresponding to each SKU. In some implementations, the inventory data can be received through a computer or mobile terminal that is connected to the FO system 104. In some cases, the inventory data can be received through the FM system 101 and transferred to the FO system 104, and then retrieved by the computer terminal or the mobile terminal.

The warehouse (e.g., the FC 200), as shown in FIG. 3A, can include a plurality of storage systems disposed in the warehouse, where each storage system can include a plurality of slots configured to store one or more of the plurality of SKUs. Each storage system can be associated with (i) a slot capacity of each slot, (ii) a temperature zone in the warehouse, and (iii) a transportation device configured to move the plurality of SKUs among the plurality of storage systems or within one storage system.

Operations of process 500 can include determining a sales velocity of each of the plurality of SKUs (520). For example, the sales velocity can be determined by selecting sample SKUs of the fulfillment center, determining sample sales velocities of the sample SKUs based on a number of orders of each of the sample SKUs for a predetermined period, and determining the sales velocities of the order SKUs corresponding to the sample sales velocities, respectively. In some examples, the sample sales velocities can be also determined by a speed of replenishment of an SKU to a slot of a storage or flow rack. In some examples, the sales velocity can be determined by monitoring sales data over a predetermined period and a replenishment rate of each SKUs.

In some examples, operations of the process 520 can include determining a volumetric sales velocity based on an order frequency and a volume of the product of each of the order SKUs. For example, the volumetric sales velocity can be obtained by multiplying a size (e.g., width, length, height, or volume) of the product and a number of the products ordered during a predetermined period. In this way, a limited slot space can be efficiently allocated. Specifically, in a case where a first product has a first volume, and a second product has a second volume greater than the first volume, the second product can be replenished faster than the first product although a second sales velocity of the second product is less than a first sales velocity of the first product. In this case, the second product can be assigned to a slot having a higher accessibility rating than the first product.

Operations of process 500 can include generating a storage allocation plan that assigns each SKU to a particular storage system among the plurality of storage systems and a particular slot of the particular storage system based on at least one of the sales velocity of the SKU, the temperature zone of the storage system, or a capacity of the transportation device (530). For example, the storage allocation plan can be a computer file or instructions.

In some implementations, operations of the process 530 can include assigning the plurality of SKUs to the particular storage system based on matching the recommended storage temperature to the temperature zone in the warehouse. In some implementations, the types of the storage systems can be also applied as a constraint for a slot allocation model for generating the storage allocation plan. In some examples, the storage allocation plan can include a table that lists possible allocation scenarios. For example, in Table 1, the warehouse has temperature zones including an ambient zone and a chilled zone, and includes storage systems including shuttles, pallets, loader/flow-racks ("MR/FR), and manual zones. The storage allocation plan can be generated with the constraints shown in Table 1. For example, SKUs assigned to the pallets in the ambient zone can be moved to the pallets, ML/FR, and manual zones in the ambient zone. As another example, SKUs assigned to the shuttles in the chilled zone can be assigned to another slot within the same storage type and temperature zone (e.g., see "Chill Shuttle" in Table 1).

TABLE 1

| Source zones | Destination zones |
|---|---|
| Ambient Pallet | Ambient Pallet, Ambient M L/FR, Ambient M anual Zone |
| Ambient M L/FR | Ambient ML/FR, Ambient M anual Zone |
| Chill Pallet | Chill Pallet, Chill ML/FR, Chill Shuttle, Chill Manual Zone |
| Chill M L/FR | Chill ML/FR, Chill Shuttle, Chill Manual Zone |
| Chill Shuttle | Chill Shuttle |

In some implementations, the storage allocation plan can be generated based on a plurality of constraints or variables. For example, the constraints can include one or more of a size (e.g., a volume, a weight, and a density) of an item corresponding to an SKU, a threshold capacity of the transportation device, and whether the item is live-stock item. For instance, the storage allocation plan can assign live-stock items to dedicated live-stock stations for the flow rack and pallet systems. In another example, the storage allocation plan can assign items having a density greater than or equal to 0.00015 g/mm$^3$ on a mezzanine level in the pallet systems.

In some examples, operations of the process 500 can include setting a threshold capacity of the transportation device, where the threshold capacity includes a speed and an operation cycle of the transportation device and a weight and a size of SKUs that the transportation device is capable to transport. In some implementations, the threshold capacity can be input/set as one of the constraints for the storage allocation model. In some examples, the threshold capacity can refer to a replenishment demand of a crane of a crane loader storage system, where the replenishment demand can be set to, for example, 2000 containers (e.g., totes) per day, which represents 90 cycles per hour for 22 hours and 15 minutes, leaving some buffer each day for the crane to service inventory tasks and/or to be offline.

In some cases, a size and a weight of an item associated with an SKU can be applied as the constraints to determine the storage allocation plan. For example, when calculating units per tote for an SKU, the weight of the items in one tote may be limited to 25 kg or less, and the volume of the items may be limited to 70% of the internal tote dimensions (e.g., 563 (L)×363 (W)×305 (H) mm).

Operations of the process 530 can include assigning slots within one storage system based on the sales velocities. For example, within the flow racks or the pallet systems, the storage allocation plan can assign fast selling items to slots located closer to a workstation terminal to thereby reduce travel distances from the respective slots to the workstation terminal. In some examples, where a certain SKU item sells faster than one workstation can manage, the storage allocation plan can assign the SKU item to multiple slots of one storage system and to multiple workstations configured to be fed items from in the one storage system.

Operations of the process 500 can include determining an empty-slot ratio of empty slots relative to a total number of the plurality of slots of each of the plurality of storage systems such that the storage allocation plan can be generated based on the empty slots while maintaining the empty-slot ratio to be greater than a predetermined ratio (e.g., 15%).

Operations of the process 500 can include setting a target throughput for each type of storage zone that is defined by the temperature zone and storage system. For instance, the target throughputs or number of picks per day (HTP or Z values) can be set as 476 for a chilled shuttle, 242 for a chilled ML/FR, 238 for chilled pallets, 188 for ambient ML/FR, and 242 for ambient pallets. With these target Z values, the storage allocation plan can be generated within a range of [0.9Z, 1.1Z] to thereby evenly balance the pick demands across the automated storage systems.

In some implementations, the storage allocation plan can be generated by using a predicted allocation model by machine learning based on inputs of (i) prior sales data of sample SKUs and (ii) prior storage allocation plans that were generated for sales periods of the prior sales data of the sample SKUs, where the storage allocation plan can be determined based on an output of the predicted allocation model from an input of the order SKUs. In some examples, an artificial intelligence (AI) model can be trained in real time with (i) sales data of sample SKUs and (ii) storage allocation plans generated for sales periods of the sales data of the sample SKUs. The AI model can correlate the sales data and the storage allocation plans and output a storage allocation plan from input of an SKU list. The AI model can perform an algorithm to generate the workstation allocation plan by minimizing a loss function corresponding to the discrepancy between the throughputs of the plurality of storage systems. In some cases, the AI model can be previously trained in another warehouse facility and provided to the fulfillment center.

Operations of process 500 can include transmitting the storage allocation plan to the transportation device to move products corresponding to the plurality of SKUs in accordance with the storage allocation plan (540). In some examples, where the transportation device is an automated system such as shuttle storage systems, crane loader systems, AGVs, etc., operations of the process 540 can include transmitting an instruction to a receiver or controller of the transportation device to execute the storage allocation plan. For instance, the crane can be configured to, based on receiving the instruction, deliver items of the SKUs from the crane loader system to another storage system and slots thereof that are assigned by the storage allocation plan. The transmitter and the receiver include electric circuits configured to communicate signals between the automated system and the transportation device and among various systems, e.g., the FM system 101, the external interface system 102, the tracking system 103, and the FO system 104 (see FIG. 1).

In some cases, operations of the process 540 can also include transmitting, via a wire or wirelessly, an instruction to a computer or a mobile terminal of an operator of the transportation device such that the operator can perform the workstation allocation plan using the transportation device. For example, the operator of the forklift 318 or some other manual transportation device can deliver items to the one or more particular storage systems and slots thereof that are assigned by the storage allocation plan. In some cases, the operator can hand-carry the items according to the storage allocation plan.

Figure 6:
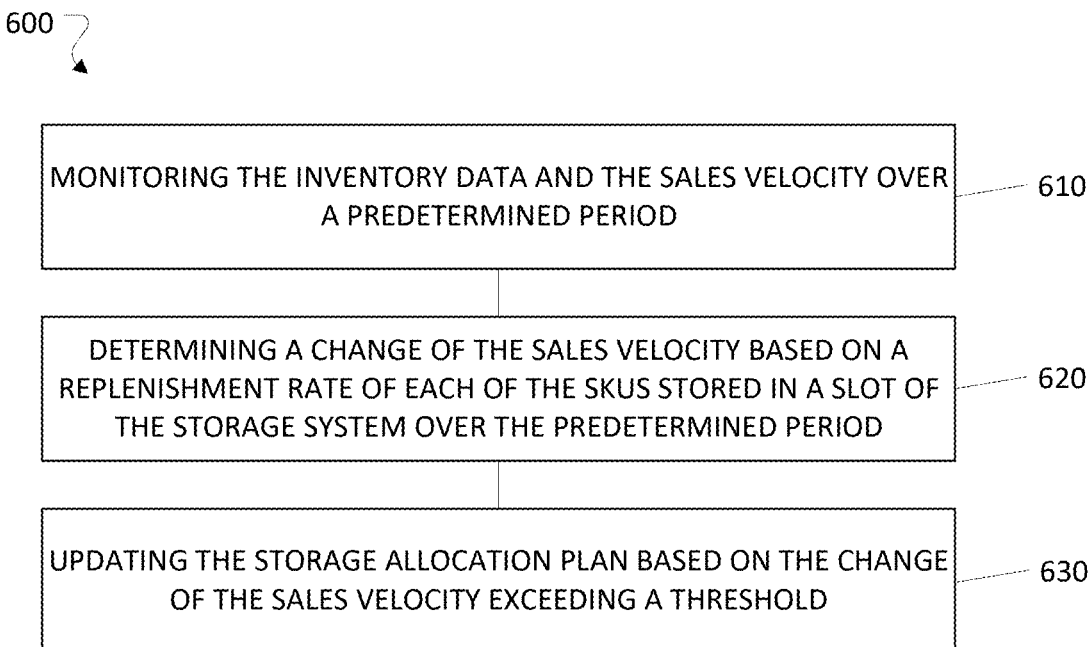
FIG. 6 is a flowchart showing an example process for re-slotting storages at a fulfillment center.

FIG. 6 is a flowchart showing an example process 600 for re-slotting storages at a fulfillment center. At least a portion of the process 600 can be performed by various elements of the FM system 101 or FO system 104.

In some implementations, the process 600 can be performed after an initial storage allocation plan has been applied according to the process 500 described above. In some examples, the process 600 can be performed after a random storage allocation has been applied to a fulfilment center.

For example, operations of the process 600 can include monitoring the sales velocity over a predetermined period (610). For example, the sales velocity can be monitored for sample SKUs or all SKUs in the inventory data for one or more days, one or more weeks, or one or more years. In some cases, seasonal sales data can be also used as explained above with respect to the workstation allocation plan.

In addition, the inventory data can vary over time, as well, due to life cycles of products. As such, operations of the process 600 can include determining a change of the sales velocity based on a replenishment rate of each of the SKUs stored in a slot of the storage system over the predetermined period (620). According to life cycles of produces, new SKU items can be stocked in the fulfillment center, and old SKU items can be discontinued, which can be reflected in the change of the sale velocity.

Operations of the process 600 can include updating the storage allocation plan based on the change of the sales velocity exceeding a threshold (630). In some examples, since the update of the storage allocation or re-slotting of the storage slots is performed by using physical resources such as transportation devices and human labor, the updates may be limited to a case where the change of the sales velocity exceeds a certain threshold level. However, the updates can be done in real time, in some cases. The updated storage allocation plan can be transmitted to the transportation device using the process 540. The updated storage allocation plan can be executed via automated transportation devices such as cranes, shuttles, and AGVs. In some cases, the updated storage allocation plan can be executed via human workers and manual equipment such as forklifts and dollies. The storage allocation plan can minimize such a manual movement of items between storage systems and slots.

In some implementations, operations of the process 600 can include determining a throughput rating of each of the plurality of storage systems based on a transportation capacity of the respective transportation device, a transportation speed of the respective transportation device, and travel distances from the respective storage system to workstations that are provided downstream of at least one of the plurality of storage systems. For example, the pallet storage systems 206 can be assigned to throughput rating A, and the crane loader systems 204 can be assigned to throughput rating B indicating a slower sales velocity (e.g., replenishment rate) than the throughput rating A. The shuttle storage systems 202 can be assigned to throughput rating C indicating a slower sales velocity than the throughput rating B. In some implementations, operations of the process 600 can include updating the storage allocation plan based on matching the sales velocity to the throughput rating. For example, the storage allocation plan can assign SKUs between storage systems having different throughput ratings among A, B, and C. In detail, the assignment of the SKU of a fast-selling product can be moved from a storage system having the throughput rating B to a storage system having the throughput rating A, and the assignment of the SKU of a slow-selling product can be moved from a storage system having the throughput rating B to a storage system having the throughput rating C.

FIG. 7 is a flowchart showing an example process 700 for slotting and re-slotting storages at a fulfillment center. For example, "re-slotting" can refer to a change of physical locations of items corresponding to SKUs. At least a portion of the process 700 can be performed by various elements of the FM system 101 or FO system 104.

Operations of the process 700 can include determining whether a destination slot of a destination storage system among the plurality of storage systems is empty (710). For example, the FO system 104 can determine whether a slot is empty based on sales data and inventory data. In some cases, when the sales data indicate that an SKU has been sold out and no item remains in the inventory data, the FO system 104 can determine that the slot is empty. In some cases, the storage system can include a sensor (e.g., cameras, scales, etc.) configured to detect whether a slot of the storage system is empty. In some examples, the empty slots can be determined virtually using a binary code associated with each slot and displayed in a graphic user interface (GUI). In some cases, operators can input, to the FO system 104, slot status information whether the destination slot is empty.

Operations of the process 700 can include, based on determining that the destination slot is not empty, setting a replenishment threshold of the destination slot to a first preset value to thereby stop new replenishment to the destination slot (720). For example, the first preset value can be zero.

Operations of the process 700 can include transmitting the storage allocation plan to the transportation device based on determining that the destination slot becomes empty after the replenishment threshold has been set to the first preset value (730). That is, before applying an updated storage allocation plan, the FO system 104 is configured to wait until the destination slot becomes empty after the replenishment threshold has been set to the first preset value, and then apply the updated storage allocation plan.

Operations of the process 700 can include resetting the replenishment threshold of the destination slot to a second preset value greater than the first preset value (740). For instance, the second preset value can be 5. This approach, namely setting and resetting the replenishment threshold in the processes 720 and 740, can be performed in a case where an SKU is moving within one storage system (e.g., the crane loader system 204). For instance, the replenishment threshold can be modified through a GUI. In some cases, where an SKU is being completely removed from a storage system, the processes 720 and 740 can be skipped, and instead the FO system 104 can wait until the inventory of the SKU naturally sells out from the storage system and flow racks.

In some implementations, the storage allocation plan can be modified through a GUI disposed on a computer or a mobile terminal. For example, a particular slot can be deleted and added to an assignment of an SKU, using graphical buttons or gestures on the GUI.

Figure 8:
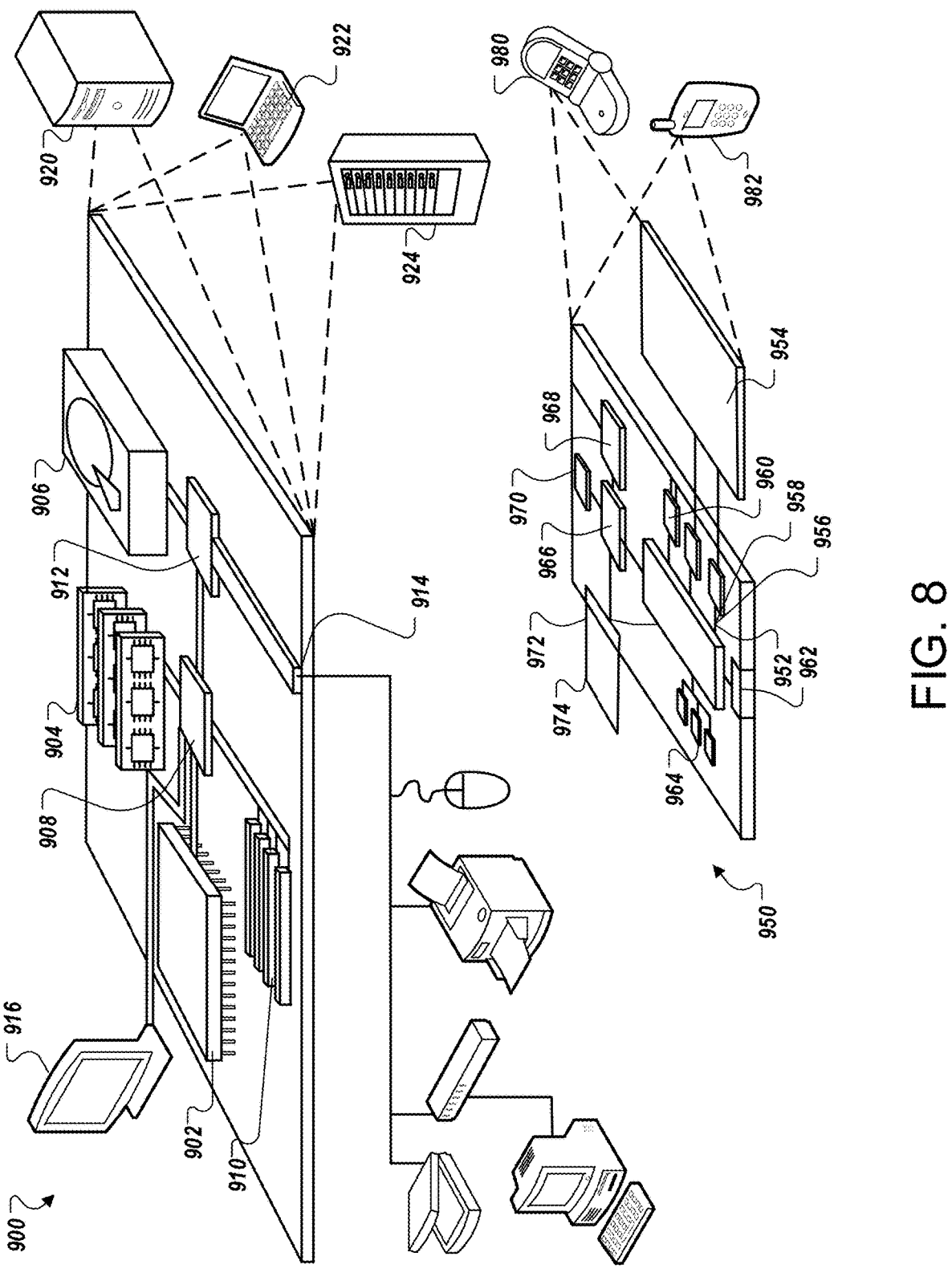
FIG. 8 is a diagram illustrating an example of a computing system that can be used in connection with computer-implemented methods described in this specification.

FIG. 8 shows an example of a computing device 900 and a mobile computing device 950 (also referred to herein as a wireless device) that are employed to execute implementations of the present disclosure. The computing device 900 is intended to represent various forms of digital computers, such as laptops, desktops, workstations, personal digital assistants, servers, blade servers, mainframes, and other appropriate computers. The mobile computing device 950 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 900 and/or the mobile computing device 950 can form at least a portion of the application installation environment described above.

The computing device 900 includes a processor 902, a memory 904, a storage device 906, a high-speed interface 908, and a low-speed interface 912. In some implementations, the high-speed interface 908 connects to the memory 904 and multiple high-speed expansion ports 910. In some implementations, the low-speed interface 912 connects to a low-speed expansion port 914 and the storage device 904. Each of the processor 902, the memory 904, the storage device 906, the high-speed interface 908, the high-speed expansion ports 910, and the low-speed interface 912, are interconnected using various buses, and may be mounted on a common motherboard or in other manners as appropriate. The processor 902 can process instructions for execution within the computing device 900, including instructions stored in the memory 904 and/or on the storage device 906 to display graphical information for a graphical user interface (GUI) on an external input/output device, such as a display 916 coupled to the high-speed interface 908. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 may also be another form of a computer-readable medium, such as a magnetic or optical disk.

The storage device 906 is capable of providing mass storage for the computing device 900. In some implementations, the storage device 906 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 902, perform one or more methods, such as those described above. The instructions can also be stored by one or more storage devices, such as computer-readable or machine-readable mediums, such as the memory 904, the storage device 906, or memory on the processor 902.

The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 904, the display 916 (e.g., through a graphics processor or accelerator), and to the high-speed expansion ports 910, which may accept various expansion cards. In the implementation, the low-speed interface 912 is coupled to the storage device 906 and the low-speed expansion port 914. The low-speed expansion port 914, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 914 through a network adapter. Such network input/output devices may include, for example, a switch or router.

The computing device 900 may be implemented in a number of different forms, as shown in the FIG. 9. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device, such as a mobile computing device 950. Each of such devices may contain one or more of the computing devices 900 and the mobile computing device 950, and an entire system may be made up of multiple computing devices communicating with each other. The computing device 900 may be implemented in the plurality of systems described with respect to FIGS. 1-3.

The mobile computing device 950 includes a processor 952; a memory 964; an input/output device, such as a display 954; a communication interface 966; and a transceiver 968; among other components. The mobile computing device 950 may also be provided with a storage device, such as a micro-drive or other device, to provide additional storage. Each of the processor 952, the memory 964, the display 954, the communication interface 966, and the transceiver 968, are interconnected using various buses, and several of the components may be mounted on a common motherboard or in other manners as appropriate. In some implementations, the mobile computing device 950 may include a camera device(s) (not shown).

The processor 952 can execute instructions within the mobile computing device 950, including instructions stored in the memory 964. The processor 952 may be implemented as a chipset of chips that include separate and multiple analog and digital processors. For example, the processor 952 may be a Complex Instruction Set Computers (CISC) processor, a Reduced Instruction Set Computer (RISC) processor, or a Minimal Instruction Set Computer (MISC) processor. The processor 952 may provide, for example, for coordination of the other components of the mobile computing device 950, such as control of user interfaces (UIs), applications run by the mobile computing device 950, and/or wireless communication by the mobile computing device 950.

The processor 952 may communicate with a user through a control interface 958 and a display interface 956 coupled to the display 954. The display 954 may be, for example, a Thin-Film-Transistor Liquid Crystal Display (TFT) display, an Organic Light Emitting Diode (OLED) display, or other appropriate display technology. The display interface 956 may include appropriate circuitry for driving the display 954 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 964 stores information within the mobile computing device 950. The memory 964 can be implemented as one or more of a computer-readable medium or media, a volatile memory unit or units, or a non-volatile memory unit or units. An expansion memory 974 may also be provided and connected to the mobile computing device 950 through an expansion interface 972, which may include, for example, a Single in Line Memory Module (SIM M)

card interface. The expansion memory 974 may provide extra storage space for the mobile computing device 950, or may also store applications or other information for the mobile computing device 950. Specifically, the expansion memory 974 may include instructions to carry out or supplement the processes described above, and may include secure information also. Thus, for example, the expansion memory 974 may be provided as a security module for the mobile computing device 950, and may be programmed with instructions that permit secure use of the mobile computing device 950. In addition, secure applications may be provided via the SIM M cards, along with additional information, such as placing identifying information on the SIM M card in a non-hackable manner.

The memory may include, for example, flash memory and/or non-volatile random access memory (NV RAM), as discussed below. In some implementations, instructions are stored in an information carrier. The instructions, when executed by one or more processing devices, such as processor 952, perform one or more methods, such as those described above. The instructions can also be stored by one or more storage devices, such as one or more computer-readable or machine-readable mediums, such as the memory 964, the expansion memory 974, or memory on the processor 952. In some implementations, the instructions can be received in a propagated signal, such as, over the transceiver 968 or the external interface 962.

The mobile computing device 950 may communicate wirelessly through the communication interface 966, which may include digital signal processing circuitry where necessary. The communication interface 966 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA 2000, General Packet Radio Service (GPRS). Such communication may occur, for example, through the transceiver 968 using a radio frequency. In addition, short-range communication, such as using a Bluetooth or Wi-Fi, may occur. In addition, a Global Positioning System (GPS) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, etc.) and may also include sound generated by applications operating on the mobile computing device 950.

The mobile computing device 950 may be implemented in a number of different forms, as shown in FIG. 8. For example, it may be implemented in the devices and mobile devices described with respect to FIGS. 1-5 and 7-10. Other implementations may include a phone device 982 and a tablet device 984. The mobile computing device 950 may also be implemented as a component of a smart-phone, personal digital assistant, AR device, or other similar mobile device.

Computing device 900 and/or 950 can also include USB flash drives. The USB flash drives may store operating systems and other applications. The USB flash drives can include input/output components, such as a wireless transmitter or USB connector that may be inserted into a USB port of another computing device.

The operations described in this application not only optimize travel efficiency but also allow the FO system 104 to factor in additional variables such as real-time order priorities, item location density, collection container capacity, and transportation capacity. For example, by allocating slots of storage systems and flow racks, the FO system 104 can ensure that the picker completes tasks within a specific zone before moving to a different area, thereby reducing overall cycle times. Moreover, the operations also enable flexibility in accommodating urgent or high-priority orders and changes in sales velocity, without requiring additional resources or significant workflow disruption.

The integration of such dynamic allocation systems ensures scalability and adaptability within the FC operations, providing an optimal balance among human workloads and between human labor and automated coordination for enhanced productivity.

Although a few implementations have been described in detail above, other modifications may be made without departing from the scope of the inventive concepts described herein, and, accordingly, other implementations are within the scope of the following claims.

What is claimed is:

1. A method performed by a computer-implemented system for managing storage allocation in a warehouse, the method comprising:

obtaining inventory data including a plurality of stock keeping units (SKUs), each SKU being associated with a product, a size of the product, and a recommended storage temperature of the product, wherein the warehouse includes a plurality of storage systems disposed in the warehouse, each storage system including a plurality of slots configured to store one or more of the plurality of SKUs, wherein each storage system is associated with (i) a slot capacity of each slot, (ii) a temperature zone in the warehouse, and (iii) an automated transportation device that is configured to move the plurality of SKUs among the plurality of storage systems or within one storage system and connected with the computer-implemented system via a network;

determining a sales velocity of each of the plurality of SKUs;

generating a storage allocation plan that assigns each SKU to a particular storage system among the plurality of storage systems and a particular slot of the particular storage system based on at least one of the sales velocity of the SKU, the temperature zone of the storage system, or a capacity of the automated transportation device;

transmitting, via the network, the storage allocation plan to the automated transportation device to move products corresponding to the plurality of SKUs in accordance with the storage allocation plan;

determining a throughput rating of each of the plurality of storage systems based on a transportation capacity of the respective automated transportation device, a transportation speed of the respective automated transportation device, and travel distances from the respective storage system to workstations that are provided downstream of at least one of the plurality of storage systems;

updating the storage allocation plan based on matching the sales velocity to the throughput rating; and transmitting, via the network, the updated storage allocation plan to the automated transportation device, to thereby control the automated transportation device to execute the updated storage allocation plan and follow a predefined travel route to deliver the products such that a movement of the products between the plurality of storage systems or between the plurality of slots is minimized in real time.

2. The method of claim 1, wherein generating the storage allocation plan further comprises assigning the plurality of SKUs to the particular storage system based on matching the recommended storage temperature to the temperature zone in the warehouse.

3. The method of claim 1, wherein generating the storage allocation plan comprises:

generating a predicted allocation model by machine learning based on inputs of (i) prior sales data of sample SKUs and (ii) prior allocation plans that were generated for sales periods of the prior sales data of the sample SKUs; and determining the storage allocation plan based on an output of the predicted allocation model from an input of the plurality of SKUs.

4. The method of claim 1, further comprising:

monitoring the inventory data and the sales velocity over a predetermined period;

determining a change of the sales velocity based on a replenishment rate of each of the SKUs stored in a slot of the storage systems over the predetermined period;

updating the storage allocation plan based on the change of the sales velocity exceeding a threshold; and transmitting the updated storage allocation plan to the automated transportation device.

5. The method of claim 4, wherein monitoring the sales velocity comprises obtaining prior sales data of the plurality of SKUs for one or more weeks, one or more months, or one or more years.

6. The method of claim 1, further comprising:

determining whether a destination slot of a destination storage system among the plurality of storage systems is empty; and based on determining that the destination slot is not empty, setting a replenishment threshold of the destination slot to a first preset value to thereby stop new replenishment to the destination slot, and wherein transmitting the storage allocation plan comprises:

transmitting the storage allocation plan to the automated transportation device based on determining that the destination slot becomes empty after the replenishment threshold has been set to the first preset value, and resetting the replenishment threshold of the destination slot to a second preset value greater than the first preset value.

7. The method of claim 1, further comprising:

determining an empty-slot ratio of empty slots relative to a total number of the plurality of slots of each of the plurality of storage systems, wherein generating the storage allocation plan comprises generating the storage allocation plan based on the empty slots while maintaining the empty-slot ratio to be greater than or equal to a predetermined ratio.

8. The method of claim 1, wherein determining the sales velocity comprises determining a volumetric sales velocity based on a demand frequency and the size of each of the plurality of SKUs.

9. The method of claim 1, wherein the plurality of storage systems comprise (i) a shuttle system comprising racks and rails, (ii) a loader system comprising racks and cranes, and (iii) a pallet system comprising pallets that are made of wood, plastic, or metal, and wherein the automated transportation device comprises rails, cranes, a conveyor system, automated ground vehicles (AGVs), or forklifts.

10. A computer-implemented system for managing storage allocation in a warehouse, the computer-implemented system comprising:

at least one processor; and a non-transitory memory coupled to the at least one processor and storing instructions that, based on being executed by the at least one processor, perform operations comprising:

obtaining inventory data including a plurality of stock keeping units (SKUs), each SKU being associated with a product, a size of the product, and a recommended storage temperature of the product, wherein the warehouse includes a plurality of storage systems disposed in the warehouse, each storage system including a plurality of slots configured to store one or more of the plurality of SKUs, wherein each storage system is associated with (i) a slot capacity of each slot, (ii) a temperature zone in the warehouse, and (iii) an automated transportation device that is configured to move the plurality of SKUs among the plurality of storage systems or within one storage system and connected with the computer-implemented system via a network;

determining a sales velocity of each of the plurality of SKUs; generating a storage allocation plan that assigns each SKU to a particular storage system among the plurality of storage systems and a particular slot of the particular storage system based on at least one of the sales velocity of the SKU, the temperature zone of the storage system, or a capacity of the automated transportation device;

transmitting, via the network, the storage allocation plan to the automated transportation device to move products corresponding to the plurality of SKUs in accordance with the storage allocation plan;

determining a throughput rating of each of the plurality of storage systems based on a transportation capacity of the respective automated transportation device, a transportation speed of the respective automated transportation device, and travel distances from the respective storage system to workstations that are provided downstream of at least one of the plurality of storage systems;

updating the storage allocation plan based on matching the sales velocity to the throughput rating; and transmitting, via the network, the updated storage allocation plan to the automated transportation device, to thereby control the automated transportation device to execute the updated storage allocation plan and follow a predefined travel route to deliver the products such that a movement of the products between the plurality of storage systems or between the plurality of slots is minimized in real time.

11. The computer-implemented system of claim 10, wherein generating the storage allocation plan further comprises assigning the plurality of SKUs to the particular storage system based on matching the recommended storage temperature to the temperature zone in the warehouse.

12. The computer-implemented system of claim 10, wherein generating the storage allocation plan comprises:

generating a predicted allocation model by machine learning based on inputs of (i) prior sales data of sample SKUs and (ii) prior allocation plans that were generated for sales periods of the prior sales data of the sample SKUs; and determining the storage allocation plan based on an output of the predicted allocation model from an input of the plurality of SKUs.

13. The computer-implemented system of claim 10, wherein the operations further comprise:

monitoring the inventory data and the sales velocity over a predetermined period;

determining a change of the sales velocity based on a replenishment rate of each of the SKUs stored in a slot of the storage systems over the predetermined period;

updating the storage allocation plan based on the change of the sales velocity exceeding a threshold; and transmitting the updated storage allocation plan to the automated transportation device.

14. The computer-implemented system of claim 13, wherein monitoring the sales velocity comprises obtaining prior sales data of the plurality of SKUs for one or more weeks, one or more months, or one or more years.

15. The computer-implemented system of claim 10, wherein the operations further comprise:

determining whether a destination slot of a destination storage system among the plurality of storage systems is empty; and based on determining that the destination slot is not empty, setting a replenishment threshold of the destination slot to a first preset value to thereby stop new replenishment to the destination slot, and wherein transmitting the storage allocation plan comprises:

transmitting the storage allocation plan to the automated transportation device based on determining that the destination slot becomes empty after the replenishment threshold has been set to the first preset value, and resetting the replenishment threshold of the destination slot to a second preset value greater than the first preset value.

16. The computer-implemented system of claim 10, wherein the operations further comprise:

determining an empty-slot ratio of empty slots relative to a total number of the plurality of slots of each of the plurality of storage systems, wherein generating the storage allocation plan comprises generating the storage allocation plan based on the empty slots while maintaining the empty-slot ratio to be greater than or equal to a predetermined ratio.

17. The computer-implemented system of claim 10, wherein determining the sales velocity comprises determining a volumetric sales velocity based on a demand frequency and the size of each of the plurality of SKUs.

18. The computer-implemented system of claim 10, wherein the plurality of storage systems comprise (i) a shuttle system comprising racks and rails, (ii) a loader system comprising racks and cranes, and (iii) a pallet system comprising pallets that are made of wood, plastic, or metal, and wherein the automated transportation device comprises rails, cranes, a conveyor system, automated ground vehicles (AGVs), or forklifts.

19. A method performed by a computer-implemented system for managing storage allocation in a warehouse, the method comprising:

obtaining inventory data including a plurality of stock keeping units (SKUs), each SKU being associated with a product, a size of the product, and a recommended storage temperature of the product, wherein the warehouse includes a plurality of storage systems disposed in the warehouse, each storage system including a plurality of slots configured to store one or more of the plurality of SKUs, wherein each storage system is associated with (i) a slot capacity of each slot, (ii) a temperature zone in the warehouse, and (iii) an automated transportation device that is configured to move the plurality of SKUs among the plurality of storage systems or within one storage system and connected with the computer-implemented system via a network;

determining a sales velocity of each of the plurality of SKUs;

generating a storage allocation plan that assigns each SKU to a particular storage system among the plurality of storage systems and a particular slot of the particular storage system based on at least one of the sales velocity of the SKU, the temperature zone of the storage system, or a capacity of the automated transportation device;

determining whether a destination slot of a destination storage system among the plurality of storage systems is empty;

based on determining that the destination slot is not empty, setting a replenishment threshold of the destination slot to a first preset value to thereby stop new replenishment to the destination slot;

transmitting, via the network, the storage allocation plan to the automated transportation device to move products corresponding to the plurality of SKUs in accordance with the storage allocation plan based on determining that the destination slot becomes empty after the replenishment threshold has been set to the first preset value;

resetting the replenishment threshold of the destination slot to a second preset value greater than the first preset value;

determining a throughput rating of each of the plurality of storage systems based on a transportation capacity of the respective automated transportation device, a transportation speed of the respective automated transportation device, and travel distances from the respective storage system to workstations that are provided downstream of at least one of the plurality of storage systems;

updating the storage allocation plan based on matching the sales velocity to the throughput rating; and transmitting, via the network, the updated storage allocation plan to the automated transportation device, to thereby control the automated transportation device to execute the updated storage allocation plan and follow a predefined travel route to deliver the products such that a movement of the products between the plurality of storage systems or between the plurality of slots is minimized in real time.

20. A method performed by a computer-implemented system for managing storage allocation in a warehouse, the method comprising:

obtaining inventory data including a plurality of stock keeping units (SKUs), each SKU being associated with a product, a size of the product, and a recommended storage temperature of the product, wherein the ware-house includes a plurality of storage systems disposed in the warehouse, each storage system including a plurality of slots configured to store one or more of the plurality of SKUs, wherein each storage system is associated with (i) a slot capacity of each slot, (ii) a temperature zone in the warehouse, and (iii) an auto-mated transportation device that is configured to move the plurality of SKUs among the plurality of storage systems or within one storage system and connected with the computer-implemented system via a network;

determining a sales velocity of each of the plurality of SKUs;

determining an empty-slot ratio of empty slots relative to a total number of the plurality of slots of each of the plurality of storage systems;

generating a storage allocation plan that assigns each SKU to a particular storage system among the plurality of storage systems and a particular slot of the particular storage system based on {ii at least one of the sales velocity of the SKU, the temperature zone of the storage system, or a capacity of the automated trans-portation device and (ii) the empty slots while main-taining the empty-slot ratio to be greater than or equal to a predetermined ratio; transmitting, via the network, the storage allocation plan to the automated transportation device to move prod-ucts corresponding to the plurality of SKUs in accor-dance with the storage allocation plan;

determining a throughput rating of each of the plurality of storage systems based on a transportation capacity of the respective automated transportation device, a trans-portation speed of the respective automated transpor-tation device, and travel distances from the respective storage system to workstations that are provided downstream of at least one of the plurality of storage systems;

updating the storage allocation plan based on matching the sales velocity to the throughput rating; and transmitting, via the network, the updated storage allocation plan to the automated transportation device, to thereby control the transport device to execute the updated storage allocation plan and follow a predefined travel route to deliver the products such that a move-ment of the products between the plurality of storage systems or between the plurality of slots is minimized in real time.

21. A computer-implemented system for managing stor-age allocation in a warehouse, the computer-implemented system comprising: at least one processor; and a non-transitory memory coupled to the at least one processor and storing instructions that, based on being executed by the at least one processor, perform opera-tions comprising: obtaining inventory data including a plurality of stock keeping units (SKUs), each SKU being associated with a product, a size of the product, and a recommended storage temperature of the product, wherein the ware-house includes a plurality of storage systems disposed in the warehouse, each storage system including a plurality of slots configured to store one or more of the plurality of SKUs, wherein each storage system is associated with (i) a slot capacity of each slot, (ii) a temperature zone in the warehouse, and (iii) an automated transportation device that is configured to move the plurality of SKUs among the plurality of storage systems or within one storage system and connected with the computer-implemented system via a network;

determining a sales velocity of each of the plurality of SKUs;

generating a storage allocation plan that assigns each SKU to a particular storage system among the plurality of storage systems and a particular slot of the particular storage system based on at least one of the sales velocity of the SKU, the temperature zone of the storage system, or a capacity of the automated trans-portation device;

determining whether a destination slot of a destination storage system among the plurality of storage systems is empty;

based on determining that the destination slot is not empty, setting a replenishment threshold of the desti-nation slot to a first preset value to thereby stop new replenishment to the destination slot;

transmitting, via the network, the storage allocation plan to the automated transportation device to move prod-ucts corresponding to the plurality of SKUs in accor-dance with the storage allocation plan based on deter-mining that the destination slot becomes empty after the replenishment threshold has been set to the first preset value;

resetting the replenishment threshold of the destination slot to a second preset value greater than the first preset value;

determining a throughput rating of each of the plurality of storage systems based on a transportation capacity of the respective automated transportation device, a trans-portation speed of the respective automated transpor-tation device, and travel distances from the respective storage system to workstations that are provided down-stream of at least one of the plurality of storage systems;

updating the storage allocation plan based on matching the sales velocity to the throughput rating; and transmitting, via the network, the updated storage alloca-tion plan to the automated transportation device, to thereby control the automated transportation device to execute the updated storage allocation plan and follow a predefined travel route to deliver the products such that a movement of the products between the plurality of storage systems or between the plurality of slots is minimized in real time.

22. A computer-implemented system for managing stor-age allocation in a warehouse, the computer-implemented system comprising:

at least one processor; and a non-transitory memory coupled to the at least one processor and storing instructions that, based on being executed by the at least one processor, perform opera-tions comprising:

obtaining inventory data including a plurality of stock keeping units (SKUs), each SKU being associated with a product, a size of the product, and a recommended storage temperature of the product, wherein the ware-house includes a plurality of storage systems disposed in the warehouse, each storage system including a plurality of slots configured to store one or more of the plurality of SKUs, wherein each storage system is associated with (i) a slot capacity of each slot, (ii) a temperature zone in the warehouse, and (iii) an auto-mated transportation device that is configured to move the plurality of SKUs among the plurality of storage systems or within one storage system and connected with the computer-implemented system via a network;

determining a sales velocity of each of the plurality of SKUs; determining an empty-slot ratio of empty slots relative to a total number of the plurality of slots of each of the plurality of storage systems;

generating a storage allocation plan that assigns each SKU to a particular storage system among the plurality of storage systems and a particular slot of the particular storage system based on (i) at least one of the sales velocity of the SKU, the temperature zone of the storage system, or a capacity of the automated transportation device and (ii) the empty slots while maintaining the empty-slot ratio to be greater than or equal to a predetermined ratio;

transmitting, via the network, the storage allocation plan to the automated transportation device to move products corresponding to the plurality of SKUs in accordance with the storage allocation plan;

determining a throughput rating of each of the plurality of storage systems based on a transportation capacity of the respective automated transportation device, a transportation speed of the respective automated transportation device, and travel distances from the respective storage system to workstations that are provided downstream of at least one of the plurality of storage systems;

updating the storage allocation plan based on matching the sales velocity to the throughput rating; and transmitting, via the network, the updated storage allocation plan to the automated transportation device, to thereby control the automated transportation device to execute the updated storage allocation plan and follow a predefined travel route to deliver the products such that a movement of the products between the plurality of storage systems or between the plurality of slots is minimized in real time.

* * * * *